United States Patent
Jabara et al.

(10) Patent No.: US 9,245,408 B2
(45) Date of Patent: Jan. 26, 2016

(54) SYSTEM AND METHOD FOR GAMING USING WIRELESS COMMUNICATION DEVICES

(71) Applicant: Mobilitie, LLC, Newport Beach, CA (US)

(72) Inventors: Gary B. Jabara, Irvine, CA (US); Lloyd Frederick Linder, Agoura Hills, CA (US); David Brett Simon, Agoura Hills, CA (US)

(73) Assignee: Mobilitie, LLC, Newport Beach, CA (US)

( * ) Notice: Subject to any disclaimer, the term of this patent is extended or adjusted under 35 U.S.C. 154(b) by 0 days.

(21) Appl. No.: 14/274,192

(22) Filed: May 9, 2014

(65) Prior Publication Data

US 2014/0248959 A1  Sep. 4, 2014

Related U.S. Application Data

(60) Division of application No. 13/398,727, filed on Feb. 16, 2012, now Pat. No. 9,064,374, which is a continuation-in-part of application No. 13/363,943, filed on Feb. 1, 2012, now Pat. No. 9,179,296, which is a continuation-in-part of application No. 13/093,998, filed on Apr. 26, 2011, now Pat. No. 8,995,923, and a continuation-in-part of application No. 12/958,296, filed on Dec. 1, 2010, now Pat. No. 9,077,564, which is a continuation-in-part of application No. 12/616,958, filed on Nov. 12, 2009, now Pat. No. 8,190,119, which is a continuation-in-part of application No. 12/397,225, filed on Mar. 3, 2009, now Pat. No. 7,970,351.

(51) Int. Cl.
*A63F 13/12* (2006.01)
*G07F 17/32* (2006.01)
*H04W 4/08* (2009.01)
*H04W 4/02* (2009.01)
*H04W 76/02* (2009.01)
*H04W 4/10* (2009.01)
*H04L 29/08* (2006.01)

(52) U.S. Cl.
CPC ........ *G07F 17/3225* (2013.01); *G07F 17/3218* (2013.01); *G07F 17/3223* (2013.01); *H04W 4/02* (2013.01); *H04W 4/08* (2013.01); *H04W 76/02* (2013.01); *H04L 67/1095* (2013.01); *H04W 4/10* (2013.01)

(58) Field of Classification Search
USPC .......................................................... 463/42
See application file for complete search history.

(56) References Cited

U.S. PATENT DOCUMENTS 5,605,506 A   2/1997   Hoorn et al.
7,938,727 B1   5/2011   Konkle (Continued)

*Primary Examiner* — Pierre E Elisca
(74) *Attorney, Agent, or Firm* — Michael J. Donohue; Davis Wright Tremaine LLP

(57) ABSTRACT

A short-range wireless network is established by direct communication between wireless devices and wireless access points to permit gambling within a casino. The short communication range of the access points assures that the wireless device is in the casino. A gaming communication link is used to exchange game play data (e.g., betting, card dealing, etc.) between a gaming controller and one or more wireless devices. Game play may be conducted between a player and the house or between a plurality of payers. In one embodiment, all communication is routed between players using the gaming controller so that the house controls the transmission of all game play data.

16 Claims, 10 Drawing Sheets

(56) References Cited

U.S. PATENT DOCUMENTS

| | | |
|---|---|---|
| 8,070,600 B2 | 12/2011 | Campo et al. |
| 8,371,932 B2 * | 2/2013 | Gagner .......................... 463/25 |
| 8,376,860 B1 | 2/2013 | Boutin |
| 2002/0002075 A1 | 1/2002 | Rowe |
| 2006/0035707 A1 | 2/2006 | Nguyen |
| 2009/0186700 A1 | 7/2009 | Konkle |
| 2009/0239650 A1 * | 9/2009 | Alderucci ............ G06Q 20/207 463/25 |
| 2010/0016056 A1 | 1/2010 | Thomas et al. |
| 2010/0048302 A1 * | 2/2010 | Lutnick ................. G07F 17/32 463/42 |
| 2012/0309524 A1 * | 12/2012 | Rajaraman .......... G07F 17/3206 463/31 |
| 2013/0102372 A1 * | 4/2013 | Lutnick ............... G07F 17/3293 463/13 |
| 2014/0194192 A1 * | 7/2014 | Pierce, II ............ G07F 17/3244 463/25 |
| 2014/0204763 A1 | 7/2014 | Devnath et al. |

* cited by examiner

SYSTEM AND METHOD FOR GAMING USING WIRELESS COMMUNICATION DEVICES

RELATED APPLICATIONS

This application is a divisional of a continuation-in-part of U.S. application Ser. No. 13/398,727 field Feb. 16, 2012, which is a continuation-in-part of U.S. application Ser. No. 13/363,943 field Feb. 1, 2012, which is a continuation-in-part of U.S. application Ser. No. 13/093,998 filed on Apr. 26, 2011, which is a continuation-in-part of U.S. application Ser. No. 12/958,296 filed on Dec. 1, 2010, which is a continuation-in-part of U.S. application Ser. No. 12/616,958 filed on Nov. 12, 2009, which is a continuation-in-part of U.S. application Ser. No. 12/397,225 filed on Mar. 3, 2009, now U.S. Pat. No. 7,970,351, the entire disclosures and content of which are hereby incorporated by reference in their entirety.

BACKGROUND OF THE INVENTION

1. Field of the Invention

The present invention is directed generally to wireless communication devices and, more particularly, to a system and method of network management to permit gaming using short-range communication networks.

2. Description of the Related Art

Wireless communication networks have become commonplace. A vast array of base stations is provided by a number of different wireless service providers. Wireless communication devices, such as cell phones, personal communication system (PCS) devices, personal digital assistant (PDA) devices, and web-enabled wireless devices communicate with the various base stations using one or more known communication protocols. While early cell phone devices were limited to analog operation and voice-only communication, modern wireless devices use digital signal protocols and have sufficient bandwidth to enable the transfer of voice signals, image data, and even video streaming. In addition, web-enabled devices provide network access, such as Internet access.

In all cases, the individual wireless communication devices communicate with one or more base stations. Even when two wireless communication devices are located a few feet from each other, there is no direct communication between the wireless devices. That is, the wireless devices communicate with each other via one or more base stations and other elements of the wireless communication network.

Some wireless service providers have included push-to-talk (PTT) technology that allows group members to communicate with each other using PTT technology. Thus, when one group member presses the PTT button, the communication from that individual is automatically transmitted to the communication devices of other group members. While this gives the appearance of direct communication between the wireless devices, the communications between group members are also relayed via one or more base stations as part of the wireless network.

Therefore, it can be appreciated that there is a need for wireless communication devices that can communicate directly with nearby wireless devices. The present invention provides this, and other advantages, as will be apparent from the following detailed description and accompanying figures.

BRIEF DESCRIPTION OF THE SEVERAL VIEWS OF THE DRAWING(S)

DETAILED DESCRIPTION OF THE INVENTION

The system described herein extends the normal operational features of conventional wireless communication devices. As described above, the conventional wireless communication device communicates with a wireless communication network base station using a first transceiver (i.e., a network transceiver). The extended capabilities described herein provide a second transceiver device that allows wireless communication devices to communicate directly with each other over a short distance and further describes network management techniques capable of managing a dynamic network that may change quickly.

Figure 1:
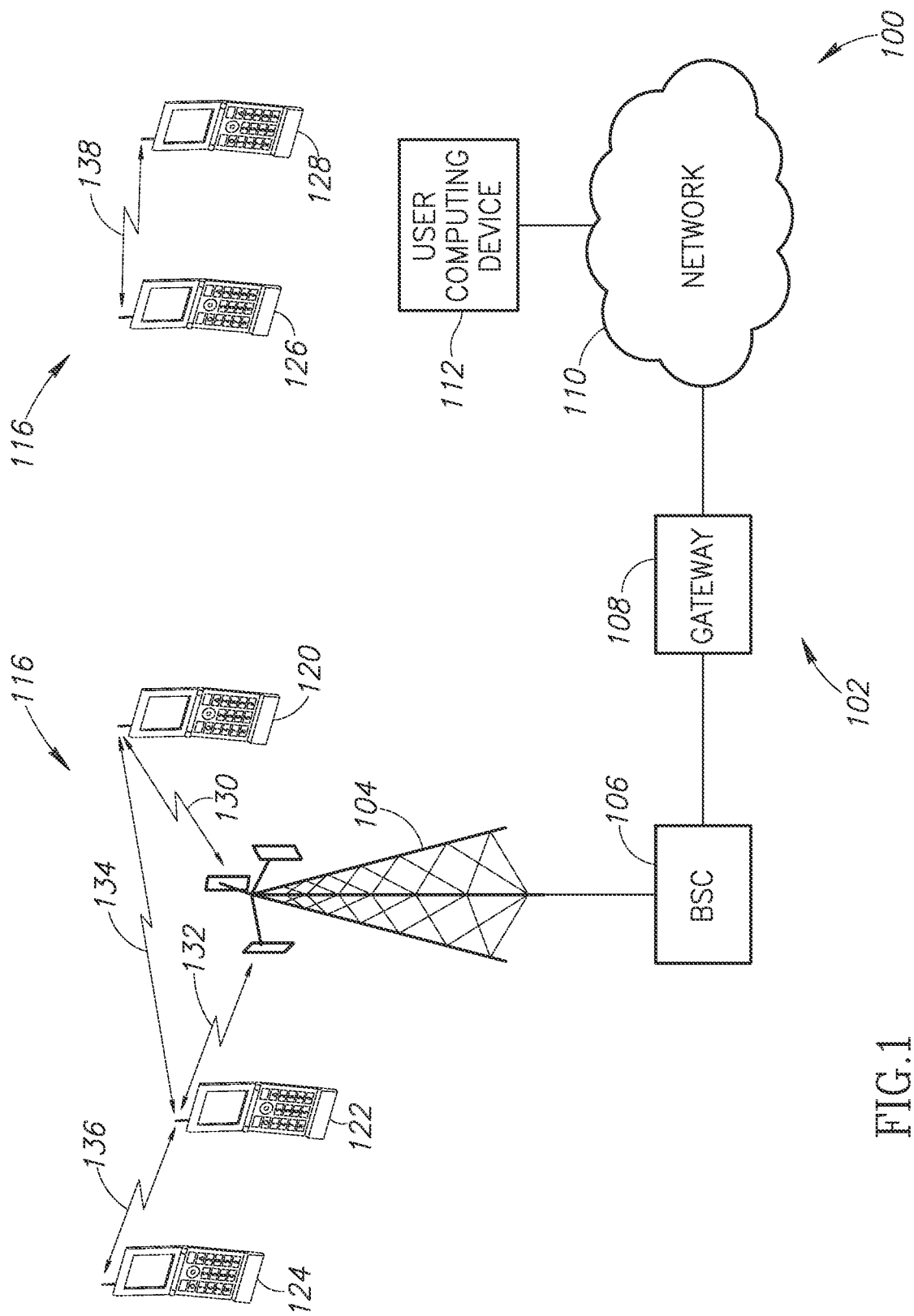
FIG. 1 is a diagram illustrating a system architecture configured to implement a communication system in accordance with the present teachings.

The wireless communication devices are illustrated as part of a system 100 illustrated in the system architecture in FIG. 1. Portions of the system 100 are conventional wireless network components that will be described briefly herein. The non-network communication capability, which may be referred to herein as a "jump-enabled" device or a "jump" device, will be described in greater detail below. The term "jump" refers to the ability of a wireless device designed and operated in accordance with the present teachings to jump from one short-range wireless network to another.

A conventional PLMN 102 includes a base station 104, which forms part of a radio access network (RAN) for a wireless service provider. The PLMN 102 may sometimes be referred to as a public land mobile network (PLMN). Those skilled in the art will appreciate that the typical PLMN 102 will include a large number of base stations 104. However, for the sake of brevity and clarity in understanding the present invention, FIG. 1 illustrates only a single base station 104.

The base station 104 is coupled to a base station controller (BSC) 106. In turn, the BSC 106 is coupled to a gateway 108. The BSC 106 may also be coupled to a mobile switching center (not shown) or other conventional wireless communication network element. The gateway 108 provides access to a network 110. The network 110 may be a private core network of the PLMN 102 or may be a wide area public network, such as the Internet. In FIG. 1, a user computing device 112 is illustrated as coupled to the network 110.

For the sake of brevity, a number of conventional network components of the wireless communication network are omitted. The particular network components may vary depending on the implementation of the PLMN 102 (e.g., CDMA vs. GSM). However, these elements are known in the art and need not be described in greater detail herein.

Also illustrated in FIG. 1 are wireless communication devices 120-128. The wireless communication devices 120-

128 are illustrative of many different types of conventional wireless communication devices capable of communicating with the base station 104 or other base stations (not shown) in the PLMN 102. The wireless communication devices 120-128 may be referred to generically as user equipment (UE). The term UE is intended to include any wireless communication device capable of processing audio, video, and text messaging. This includes smart phones, laptops, PDAs, computer tablets (e.g., an iPad™), and the like.

Those skilled in the art will appreciate that the PLMN 102 may communicate using a variety of different signaling protocols. For example, the system 100 may be successfully implemented using, by way of example, CDMA, WCDMA, GSM, UMTS, 3G, 4G, LTE, and the like. The system 100 is not limited by any specific communication protocol for the PLMN 102.

As illustrated in FIG. 1, the wireless communication device 120 communicates with the base station 104 via a wireless network communication link 130. Similarly, the wireless communication device 122 communicates with the base station 104 via a wireless network communication link 132. Each of the wireless communication devices illustrated in FIG. 1 (e.g., the wireless communication devices 120-128) contain a conventional transmitter/receiver or transceiver components to permit conventional communication with the PLMN 102 via the base station 104 or other base station (not shown). Operational details of conventional network communication are known in the art and need not be described in greater detail herein.

In addition to the conventional network transceiver components, the jump-enabled wireless communication devices illustrated in FIG. 1 (e.g., the wireless communication devices 120-128) also include a second short-range transceiver to allow direct communication between the devices. This short-range communication is accomplished without reliance on the PLMN 102. Indeed, as will be described in greater detail below, the short-range transceivers in the mobile communication devices 120-128 permit the dynamic formation of a short-range communication network 116 that does not rely on the PLMN 102 provided by any wireless service provider. Thus, wireless communication devices can rely on the conventional PLMN 102 for some communications, but may also be part of the short-range communication network 116 formed between the mobile devices themselves. In the example of FIG. 1, the wireless communication device 120 communicates with the base station 104 via the wireless network communication link 130. Similarly, the wireless communication device 122 communicates with the base station 104 via the network wireless communication link 132. However, in addition, the wireless communication devices 120 and 122 may communicate directly with each other via a short-range communication link 134.

As illustrated in FIG. 1, the wireless communication device 124 is not in communication with the PLMN 102. However, the wireless communication device 124 can communicate directly with the wireless communication device 122 via a short-range wireless communication link 136. Also illustrated in FIG. 1 are the wireless communication devices 126-128. Although neither of these devices is in communication with the PLMN 102, the two devices are in direct communication with each other via a short-range wireless communication link 138. Thus, jump-enabled wireless communication devices must be in proximity with each other, but need not be in communication with the PLMN 102 or even in an area of wireless coverage provided by the wireless communication network.

The dynamic formation of one or more short-range networks 116 allows communication between the wireless communications devices 120-128 independent of the PLMN 102 even if the PLMN 102 is present and operational. The short-range communication network 116 advantageously allows communication in settings where the PLMN 102 is not present or in a situation where the wireless communication network is unavailable. For example, the PLMN 102 may be unavailable during a power outage or an emergency situation, such as a fire, civil emergency, or the like. In contrast, the short-range communication network 116 does not rely on any infrastructure, such as cell towers, base stations, and the like. As will be described in greater detail below, the short-range communication network 116 may be extended as jump-enabled wireless communication devices move throughout a geographic location.

Figure 2:
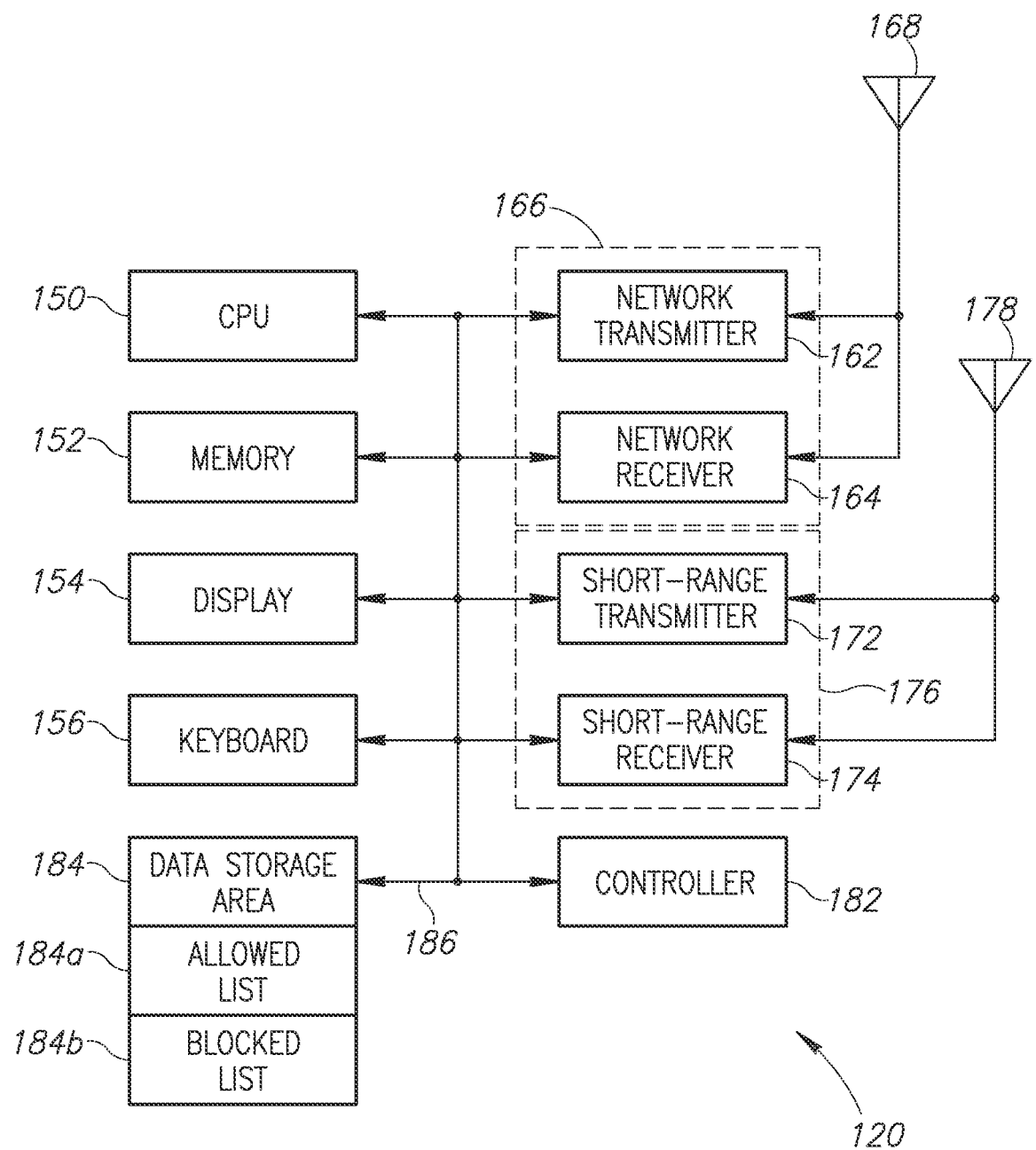
FIG. 2 is functional block diagram of one of the wireless communication devices of FIG. 1.

FIG. 2 is a functional block diagram illustrative of one of the wireless communication devices illustrated in FIG. 1 (e.g., the wireless communication device 120). The wireless communication device 120 includes a central processing unit (CPU) 150. Those skilled in the art will appreciate that the CPU 150 may be implemented as a conventional microprocessor, application specific integrated circuit (ASIC), digital signal processor (DSP), programmable gate array (PGA), or the like. The wireless communication device 120 is not limited by the specific form of the CPU 150.

The wireless communication device 120 in FIG. 2 also contains a memory 152. In general, the memory 152 stores instructions and data to control operation of the CPU 150. The memory 152 may include random access memory, ready-only memory, programmable memory, flash memory, and the like. The wireless communication device 120 is not limited by any specific form of hardware used to implement the memory 152. The memory 152 may also be integrally formed in whole or in part with the CPU 150.

The wireless communication device 120 of FIG. 2 also includes conventional components, such as a display 154 and a keypad or keyboard 156. These are conventional components that operate in a known manner and need not be described in greater detail. Other conventional components found in wireless communication devices, such as a USB interface, Bluetooth interface, camera/video device, infrared device, and the like, may also be included in the wireless communication device 120. For the sake of clarity, these conventional elements are not illustrated in the functional block diagram of FIG. 2.

The wireless communication device 120 of FIG. 2 also includes a network transmitter 162 such as may be used by the wireless communication device 120 for the conventional wireless communication network with the base station 104 (see FIG. 1). FIG. 2 also illustrates a network receiver 164 that operates in conjunction with the network transmitter 162 to communicate with the base station 104. In a typical embodiment, the network transmitter 162 and network receiver 164 share circuitry and are implemented as a network transceiver 166. The network transceiver 166 is connected to an antenna 168. The network transceiver 166 is illustrated as a generic transceiver. As previously noted, the mobile communication devices (e.g., the mobile communication devices 120-128) may be implemented in accordance with any known wireless communication protocol including, but not limited to, CDMA, WCDMA, GSM, UMTS, 3G, 4G, WiMAX, LTE, or the like. Operation of the network transceiver 166 and the antenna 168 for communication with the PLMN 102 is well-known in the art and need not be described in greater detail herein.

The wireless communication device 120 of FIG. 2 also includes a short-range transmitter 172 that is used by the wireless communication device 120 for direct communication with other jump-enabled wireless communication devices (e.g., the wireless communication device 122 of FIG. 1). FIG. 2 also illustrates a short-range receiver 174 that operates in conjunction with the short-range transmitter 172 to communicate directly with other jump-enabled wireless communication devices (e.g., the wireless communication device 122 of FIG. 1). In a typical embodiment, the short-range transmitter 172 and short-range receiver 174 are implemented as a short-range transceiver 176. The short-range transceiver 176 is connected to an antenna 178. In an exemplary embodiment, the antennas 168 and 178 may have common components are implemented as a single antenna.

FIG. 2 also illustrates a controller 182 and a data storage area 184. As will be described in detail below, the controller 182 controls the exchange of data between wireless communication devices that become part of the short-range communication network 116. The data storage 184 contains user profile data and messaging data that will be exchanged between wireless communication devices in the short-range communication network 116. The data storage area 184 may be implemented as any convenient data structure. As will be described in greater detail below, the data storage area 184 contains data (e.g., messages, personal profile information of contacts, a geographical location tag for each contact, and the like) that will be exchanged between wireless communication devices. The data may be stored as a simple list, part of a database, or any other convenient data storage structure. The user profile can include a broad array of information such as user name, nickname, age, sex, education and work background, hobbies, food preferences (love sushi, Hunan, and Mediterranean food, etc.), and the like. In one embodiment, described in U.S. application Ser. No. 12/397,225, filed on Mar. 3, 2009, now U.S. Pat. No. 7,970,351, two wireless devices may exchange portions of user profile data to determine whether there is a suitable match between the users. If the phones determine that there is a suitable match based on the user profiles, an alert signal may be generated to indicate to the individual users that there is a person nearby that they should meet. In another embodiment, user profile data may be used in a business venue to determine appropriate marketing and advertisement data based on the user profile.

The data storage area 184 also stores a list of other nearby wireless communication devices that form part of the short-range wireless communication network 116. In addition, the data storage area 184 may include an Allowed List 184*a* and a Blocked List 184*b* in connection with device authentication. As will be described in greater detail below, the Allowed List 184*a* contains identities of nearby wireless communication devices that have been verified while the Blocked List 184*b* includes a list of nearby wireless communication devices that have been determined not to be authentic or which the user, a their own discretion, has decided to block.

The various components illustrated in FIG. 2 are coupled together by a bus system 186. The bus system may include an address bus, data bus, power bus, control bus, and the like. For the sake of convenience, the various busses in FIG. 2 are illustrated as the bus system 186.

In one embodiment, when the jump-enabled wireless communication device 120 comes within range of any other jump-enabled wireless communication device (e.g., the wireless communication device 122 of FIG. 1), it establishes a short-range wireless communication link (e.g., the short-range wireless communication link 134).

In an exemplary embodiment, the short-range transceiver 176 may be designed for operation in accordance with IEEE standard 802.11, sometimes referred to as WiFi. Many modern wireless communication devices are equipped with WiFi and may be readily upgraded to support the functionality described herein. Because the wireless communication devices 120-128 all include WiFi capability, short-range communication networks 116 may be formed even though the wireless communication devices may be designed to operate with incompatible PLMNs 102. For example, the wireless communication device 122 may be configured for operation with a GSM implementation of the PLMN 102. The wireless communication device 124 may be configured for operation with a CDMA implementation of a PLMN 102. Even though the wireless communication devices 122-124 are incompatible with respect to the respective PLMNs 102, the wireless communication devices 122-124 may still communicate directly with each other via the short-range communication network 116. Thus, the wireless communication devices 120-128 may operate compatibly to form the short-range communication networks 116 even though the network transceivers 166 (see FIG. 2) may operate with different incompatible PLMNs 102.

Various techniques for establishing the short-range communication network 116 (see FIG. 1) are described in U.S. application Ser. No. 12/397,225 filed on Mar. 3, 2009, now U.S. Pat. No. 7,970,351, U.S. application Ser. No. 12/616,958 filed on Nov. 12, 2009, U.S. application Ser. No. 12/958,296, filed on Dec. 1, 2010, and U.S. application Ser. No. 13/093,988 filed on Apr. 26, 2011, the entire disclosures and content of which are hereby incorporated by reference in their entirety.

As will be discussed in greater detail below, the system 100 goes beyond some of the conventional operation of WiFi standards to permit a large number of wireless communication devices to communicate directly with each other. In one embodiment, a local hot spot is used to initiate the formation of the short-range communication network 116. Once established, the short-range communication network 116 may continue to exist even if the hot spot (or group owner) is no longer present. In yet another alternative embodiment, described below, the wireless communication devices may be pre-programmed to utilize a common SSID, IPrange, and port to spontaneously form a short-range communication network 116 even in the absence of any hot spot.

In an exemplary embodiment of the system 100, each wireless communication device (e.g., the wireless communication devices 120-128) transmits a beacon signal with the same SSID, such as the SSID "JUMMMP" to identify the device as a jump-enabled wireless communication device. In addition, the beacon frame includes several other data fields such as a media access layer (MAC) address for source and destination. In the beacon frame, the destination MAC address is set to all ones to force other wireless communication devices to receive and process the beacon frame. The beacon frame used in the system 100 may also include conventional elements, such as a time stamp used for synchronization with other wireless devices, information on supported data rates, parameter sets that indicate, for example, transceiver operational parameters such as the IEEE 802.11 channel number and signaling method such as operation at the physical layer (PHY) and operation in a direct frequency spectrum (DSSS) or a frequency hopping spread spectrum (FHSS) operational modes. These conventional WiFi parameters are known in the art and need not be described in greater detail herein.

In addition, since there is no access point, all jump-enabled wireless communication devices take on the responsibilities of the MAC layer that controls, manages, and maintains the communication between the jump-enabled wireless communication devices by coordinating access to the shared radio channel and the protocols that operate over the wireless medium. In an exemplary embodiment, the MAC is implemented in accordance with IEEE 802.2. At the PHY layer, the transceiver may operate in a DSSS or a FHSS operational mode. Alternatively, the PHY layer may be implemented using infrared transceivers. The IEEE 802.11 standard defines a common operation whether devices are using the ad hoc or the infrastructure mode. The use of the ad hoc mode only affects protocols, so there is no impact on the PHY layer. Thus, the wireless communication device 120 may operate under IEEE 802.11a at 5 gigahertz (GHz) under IEEE 802.11b/g at 2.4 GHz, or IEEE 802.11n, which operates at both 2.4 GHz and 5 GHz. Those skilled in the art will appreciate that the wireless communication device of the system 100 may be readily adapted for operation with future versions of IEEE 802.11.

In an alternative embodiment, the wireless communication devices 120-128 may be configured in accordance with IEEE WiFi Direct standards. WiFi Direct allows any wireless communication device in the short-range communication network 116 to function as the group owner. WiFi Direct simplifies the process of establishing a communication link. For example, the WiFi protected set up allows a communication link to be established by entering a PIN or other identification or, simply pressing a button. As will be described herein, the jump-enabled wireless communication devices actively seek to establish links with other jump-enabled devices to automatically establish a short-range communication network 116.

Figure 3:
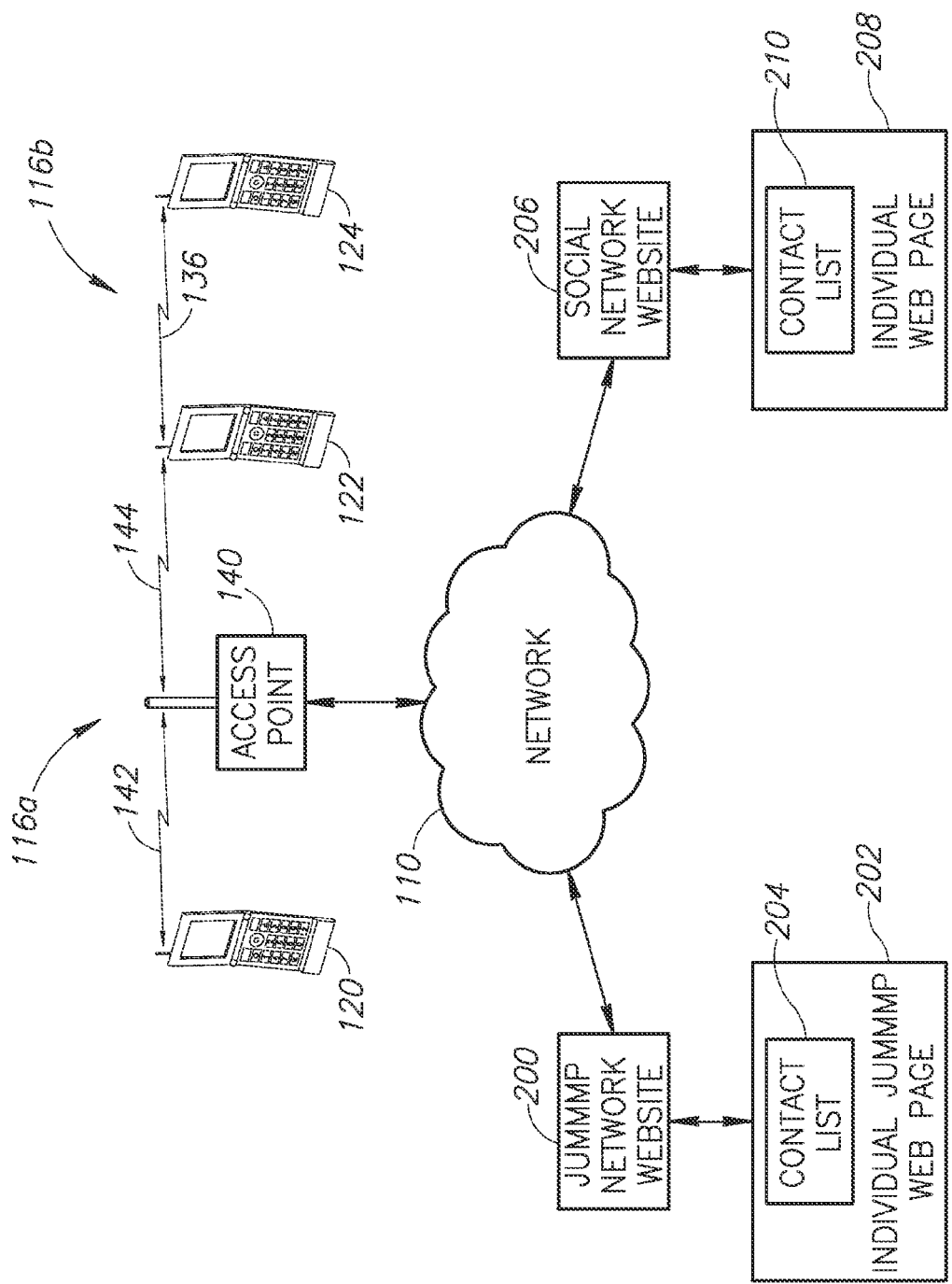
FIG. 3 illustrates an embodiment of the system of FIG. 1 using an access point as part of a network.

In yet another alternative embodiment, illustrated in FIG. 3, the jump-enabled wireless communication devices (e.g., the wireless communication devices 120-122) may communicate with an access point 140, such as a WiFi base station, WAP, wireless router, or the like. As will be described in greater detail below, a wireless communication device (e.g., one of the wireless communication devices 120-124) may function as the access point 140 to permit others of the wireless communication devices in the short range communication network 116 to access the network 110 via the wireless communication device serving as the access point. FIG. 3 illustrates a wireless communication link 142 established between the access point 140 and the wireless communication device 120. Similarly, the wireless communication device 122 establishes a wireless communication link 144 with the access point 140. Thus, a short-range communication network 116a is formed in conjunction with the access point 140. To assist in a better understanding of the present disclosure, short-range communication networks will be generally referred to by the reference 116. Specific examples of short-range communication networks will be referred to by the reference 116 and an alphabetic identifier (e.g., the short-range communication network 116a in FIG. 3).

Depending on the physical proximity of the wireless communication devices 120-124, there may be one or more short-range communication networks 116 formed. In the example of FIG. 3, the wireless communication devices 120-122 are both within range of the access point 140. Therefore, the first short-range communication network 116a can be formed with the wireless communication devices 120-122 and the access point 140.

The wireless communication device 124 is within range of the wireless communication device 122, but is not within range of the access point 140. In one embodiment, the wireless communication device 124 may be become part of the short-range communication network 116a via the wireless communication device 122. In this embodiment, the wireless communication device 122 functions as a "repeater" or relay to relay information between the wireless communication device 124 and other parts of the short-range communication network 116a. In another embodiment, a second short-range communication network 116b is formed with the wireless communication devices 122-124. In this exemplary embodiment, the wireless communication device 122 is part of both short-range communication networks 116a-116b. The wireless communication device 122 may simultaneously be a member of both short-range communication networks 116a-116b or may be logically connected to both short-range communication networks 116a-116b by alternately switching between the short-range communication networks 116a-116b.

The access point 140 is coupled to the network 110 in a conventional manner. This can include a wired or wireless connection directly to the network 110 or via an intermediate network gateway, such as those provided by an Internet Service Provider (ISP). FIG. 3 also illustrates a JUMMMP Network website 200, which may support an individual web page 202 for each member (e.g., an individual person, business, organization, etc.) of the JUMMMP Network. FIG. 3 also illustrates a generic conventional social network website 206, which may support an individual web page 208 for each member of the social network. The JUMMMP network website 200 and social network website 206 are each coupled to the network 110. Although illustrated in FIG. 3 as two separate network websites, those skilled in the art will appreciate that the JUMMMP website 200 effectively functions as a social network website. Similarly, the JUMMMP website technology can be incorporated into existing social network websites. Thus, the two separate websites illustrated in FIG. 3 can effectively be combined into a single website.

As discussed in detail in co-pending U.S. application Ser. No. 12/616,958, filed on Nov. 12, 2009 and assigned to the assignee of the present application, the user of a jump-enabled wireless communication device (e.g., the wireless device 120) may use the web-browsing capability of the wireless communication device to access the individual jump web page 202 for the individual with whom contact has just been made to learn more about that individual. Alternatively, the user of a jump-enabled wireless communication device (e.g., the wireless device 120) may use the web-browsing capability of the wireless communication device to access the user's own individual jump web page 202 to store information for the individual with whom contact has just been made. A contact list 204, which is typically a portion of the individual jump web page 202 is configured to store contact information. Similarly, the individual jump web page 208 of the social network 206 can include a contact list 210 to store contact information. In one embodiment, the contact information may include a user profile exchanged along with individual messages between users. As will be discussed in greater detail below, the user profile can include user name and preferences, as well as information about the specific exchange of messages. For example, the user profile can include the date and time at which messages were exchanged, geo-location data (e.g., latitude and longitude) of the sender of a message, and the like, and can also be stored as user profile data in the contact list 204. Applications for the profile data are described in greater detail below.

The wireless communication devices 120-128 (see FIG. 1) generally have sufficient memory capacity to temporarily store contact information. In an exemplary embodiment, the wireless communication device (e.g., the wireless communication device 120) can temporarily store new contact information until access to the network 110 becomes available at a later time. In addition, the wireless communication device 120 can store designated contact information (e.g., "Favorites") on a more permanent basis. Long-term storage of contact information requires access to the network 110. In the embodiment of FIG. 1, access to the network 110 may be provided via the base station 104 in a conventional manner. The wireless communication device 122 may access the network 110 by communicating directly with the base station 104. In the embodiment of FIG. 3, access to the network 110 may be provided via the access point 140, as described above. For example, the wireless communication device 122 in FIG. 1 may access the network 110 by communicating directly with the access point 140 via the short-range communication link 144. Alternatively, the wireless communication device 122 can access the network 110 and the JUMMMP network website 200 via the wireless communication link 132 to the base station 104. Network access via the gateway 108 is well known in the art and need not be described in greater detail herein.

In an alternative embodiment, access to the network 110 may be provided via another jump-enabled wireless communication device. For example, in FIG. 1, the wireless communication device 122 can communicate with the base station 104 via the wireless communication link 132 while the wireless communication device 124 cannot communicate directly with the base station. However, the wireless communication device 124 is in proximity with the wireless communication device 122 and can communicate with the wireless communication device 122 via the wireless communication link 136 as part of the short-range communication network 116. In this embodiment, the wireless communication device 124 can use the wireless communication device 122 as a repeater or relay to allow the wireless communication device 122 to access the network 110 via the wireless communication device 122 and the base station 104.

Similarly, in the embodiment of FIG. 3, the wireless communication devices 120-122 can communicate directly with the access point 140 via the wireless communication links 142-144, respectively. The wireless communication devices 120-122 can also communicate with each other via the access point 140 thus forming the short-range communication network 116*a*. As seen in FIG. 3, the wireless communication device 124 cannot communicate directly with the access point 140. However, the wireless communication device 124 is in proximity with the wireless communication device 122 and can communicate with the network 110 via the wireless communication device 122 and the access point 140.

Figure 4:
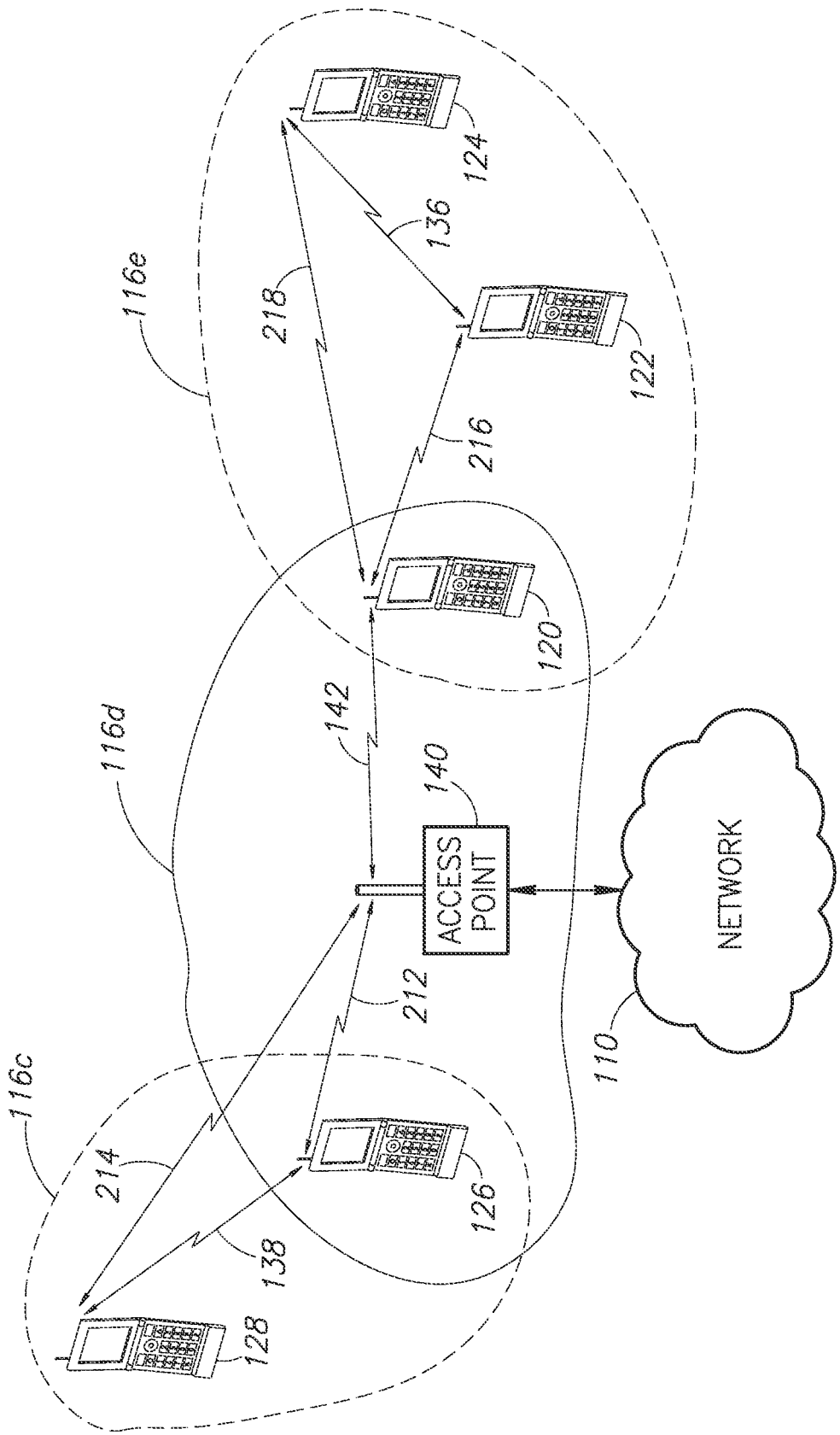
FIG. 4 illustrates a dynamic network topology using an access point.

As previously noted, the system 100 provides for the dynamic formation and rapid change in the topography of the short-range communication networks 116. For example, FIG. 1 illustrates a first short-range communication network 116 formed with the wireless communication devices 120-124 and a second short-range communication network 116 formed between the wireless communication devices 126-128. FIG. 4 illustrates the dynamic nature of the wireless communication networks 116. For example, if the wireless communication device 128 is initially within range of the wireless communication device 126, but out of range of the access point 140, the wireless communication devices 126-128 may form a short-range communication network 116*c* using the short-range communication link 138. If the wireless communication device 126 comes within range of the access point 140, a wireless communication link 212 is formed. In that event, the wireless communication device 126 may become part of a short-range communication network 116*d* formed between the access point 140 and the wireless communication devices 120 and 126. At this particular moment in time, the mobile communication device 126 may be part of both the short-range communication network 116*c* and the short-range communication network 116*d*. As discussed above, the wireless communication device 126 may actually be part of both the short-range communication networks 116*c*-116*d* or may logically be connected to both the short-range wireless communication networks by switching back and forth between the short-range communication networks 116*c*-116*d*. The logical switching between the short-range communication networks 116*c*-116*d* is transparent to the user. Other examples of the short-range communication network 116 are described below in which no access point 140 is present.

Alternatively, the wireless communication device 128 may become part of the short-range communication network 116*d* using the wireless communication device 126 as a relay to the access point 140. If, at a later time, the wireless communication device 128 comes within range of the access point 140, a wireless communication link 214 is formed there between. At that point in time, the short-range communication network 116*c* effectively ceases to exist since the wireless communication devices 126-128 are now part of the short-range communication network 116*d*.

The wireless communication device 120 may be part of the short-range communication network 116*d* by virtue of the short-range communication link 142 coupling the wireless communication device 120 to the access point 140. If the wireless communication device 120 comes within range of the wireless communication devices 122-124, wireless communication links 216-218 will be formed to couple the wireless communication devices 120-124 and thereby dynamically form a short-range communication network 116*e*. At this point in time, the wireless communication device 120 may simultaneously be part of the short-range communication network 116*d* and the short-range communication network 116*e*. Alternatively, the wireless communication devices 122-124 may become part of the short-range communication network 116*d* via the wireless communication device 120.

If the wireless communication device 120 subsequently moves out of range of the access point 140, the wireless communication link 142 is broken. Therefore, there will no longer be an overlap between the short-range communication networks 116*d*-116*e*. The wireless communication device 120 would remain part of the short-range communication network 116*e* so long as it remains within range of the wireless communication device 122, the wireless communication device 124, or both. Thus, those skilled in the art will appreciate that short-range communication networks are dynamically formed, modified, and dissolved as the wireless communication devices move in and out of range with each other and central points, such as the access point 140. Furthermore, if the wireless communication device 120 comes back into range of the access point 140, the wireless communication link 142 can be reestablished. When this happens, all prior communications from the short-range communication network 116*e* will be transferred to the short-range communication networks 116*d* and 116*c* (and vice-versa) through the re-echoing function described above. That is, the various wireless communication devices will resynchronize the data in the data storage area 184 (see FIG. 2). Those skilled in the art will also appreciate that the short-range communication networks 116 may be formed, modified, and dissolved without the presence of the access point 140.

FIG. 4 illustrates the wireless communication device 120 as a key component in the short-range communication network 116e because it connects the wireless communication devices 122-124 to the access point 140. If the wireless communication device 120 suddenly moved out of range of the access point and/or the wireless communication devices 122-124 that connection may be broken. Similarly, if the user of the wireless communication device 120 suddenly turned off the device, the link between the short-range communication network 116e and the access point 140 would disappear. The wireless communication devices 122-124 still communicate with each other via the wireless communication link 136 and will still search for other wireless communication devices with which to connect. In addition, either of the wireless communication devices 122-124 will attempt to find the access point 140 or a hot spot from which either of the wireless communication devices may access the network 110.

FIG. 4 illustrates a sparse network with only five wireless communication devices. However, those skilled in the art can appreciate that there may be a very large number of wireless communication devices in proximity with each other. For example, if FIG. 4 is illustrative of a large shopping mall, there may be hundreds of wireless communication devices within the mall. Thus, the short-range communication networks 116 may be large and extensive. There may be a large number of wireless communication devices that are simultaneously present in two or more short-range communication networks 116. In addition, many wireless communication devices would provide overlapping coverage with multiple short-range communication networks 116. In this scenario, the entire mall and surrounding parking area could be effectively covered by a mesh network comprising dozens or hundreds of short-range communication networks 116. Thus, in the situation illustrated in FIG. 4 where the wireless communication device 120 is turned off or moved out of range of other wireless communication devices is less likely to cause the total isolation of the short-range communication network 116e. If the wireless communication device 120 were suddenly removed, either by powering down or by the departure from the area, many other wireless communication devices (not shown) in the same proximity would be able to replace the connectivity between the short-range communication network 116e and the access point 140.

Whenever a wireless communication device (e.g., the wireless communication device 124) comes within range of other wireless communication devices, a short-range wireless communication network (e.g., the short-range wireless communication network 116e), the wireless communication devices exchange message data with each other to thereby synchronize message data in the data storage area 184 (see FIG. 2). At the end of the synchronization process, the data storage area 184 of each wireless communication device will contain the same message data, although messages may not be in the same sequence. In the example described above, when the wireless communication device 124 comes within range of the wireless communication device 120 and/or the wireless communication device 122, the wireless communication links 136 and 218 are formed. Because the wireless communication device 124 has just joined the short-range communication network 116e, the data storage area 184 of the wireless communication device 124 will not be synchronized with the data storage area of other wireless communication devices in the short-range communication network 116e. During the synchronization process, the wireless communication device 124 transmits message data in its data storage area 184. The wireless communication devices 120 and 122 receive the message data. The controller 182 (see FIG. 2) in each wireless communication device receives the message data and merges the messages with the message data already stored within the data storage area 184 of the wireless communication devices 120 and 122, respectively. The controller 182 in each of the wireless communication devices may also eliminate duplicate messages. In this manner, each wireless communication device manages the message data within its data storage area 184.

As part of the synchronization process, the wireless communication devices 120 and 122 may also transmit the message data within their respective data storage areas 184. The wireless communication device 124 receives the messages from the wireless communication devices 120 and 122 and merges the newly received messages in the data storage area 184 of the wireless communication device 124. As described above, the controller 182 (see FIG. 2) of the wireless communication device 124 may eliminate duplicate messages within its data storage area 184. Following this synchronization process, all wireless communication devices in the short-range communication network 116e will have identical messages.

In an exemplary embodiment, the messages may be categorized as Public Messages, Group Messages, Direct Messages, and Status Messages. Public Messages may be transmitted to anyone within range of the wireless communication device (e.g., the wireless communication device 120). This may include emergency messages, messages broadcast from a retailer, and the like. Group Messages are intended for a specific group or organization, such as a scout group or employees of a particular company or any formed group. Direct Messages are private messages intended for a specific individual. In addition, the wireless communication device 120 may transmit Status Messages, which can include, by way of example, a list of other wireless communication devices in the particular short-range communication network 116, a list of recent wireless communication devices in the particular short-range communication network, a list of other short-range communication networks in which the wireless communication device was recently a member, or the like. The data message process described above can include one or more of these message categories. Other message categories may be created as necessary.

U.S. patent application Ser. No. 13/093,998, entitled "SYSTEM AND METHOD FOR MANAGEMENT OF A DYNAMIC NETWORK USING WIRELESS COMMUNICATION DEVICES," FILED ON Apr. 26, 2011, and incorporated by reference in its entirety, provides additional details of the message exchange process. As described therein, the Public and Group Messages may be contained in one file and all Direct Messages contained in a separate file. The messages have a main header and individual message headers. The main header may include, by way of example, the date/time of the last modification, message count, the date/time of the last synchronization and the user name of the wireless communication device with which the last synchronization was performed. This information may help maintain synchronization between wireless devices.

The message data may include, but is not limited to, text message data, audio data, video data, multimedia data, or the like. As those skilled in the art will appreciate, Public Messages may be received and processed by any wireless communication device. In contrast, Group Messages may only be processed by a member of the designated group, while a Direct Message may only be processed by the individual wireless communication device for whom the message is intended.

Synchronization may occur directly between the wireless communication devices or via the access point 140 illustrated in FIG. 4. For example, message synchronization can occur between the wireless communication device 120 and the wireless communication device 126 using the access point 140. In addition, as will be described in greater detail below, wireless communication devices can carry message data as they move from one short-range communication network to another.

In another embodiment, a retail business may broadcast Public Messages to nearby wireless communication devices. In an exemplary embodiment, the retail facility can set up a wireless access point (e.g., the wireless access point 140 in FIG. 3) to establish a short-range communication network 116. For example, a retail facility in a shopping mall can transmit advertisement messages to nearby wireless communication devices. In a typical embodiment, these would be Public Messages that are freely relayed from one wireless communication device to another and from one short-range wireless communication network 116 to another. Using this form of message distribution, an advertisement from a retail facility will soon be disseminated to all wireless users in the area. The advertisements may take the form of text messages or any other data message described above.

In another aspect, an individual user may register with a business. Whenever the user comes within range of the short-range communication network 116 associated with the retail business, message data may be exchanged thus enabling the business to identify a particular user that is nearby. In this embodiment, the retail business may send a private advertisement message to the particular user. The private advertisement may be customized for the user based on a number of factors, such as the user's profile (e.g., the sex, age, and interests of the user), prior shopping patterns, or the like. It can also be based on statistical and history data that the retail business has collected on the user in one or more short-range communication networks 116 in the region around the retail business. For example, if a particular user has registered with a restaurant and comes within range of the short-range communication network 116 of that restaurant at a subsequent time after registration, the restaurant can send a private advertisement message to entice that user into the restaurant by offering a discount on a meal previously purchased by that user. If the user is a sports enthusiast, a sports bar could send a message that a particular sporting event (e.g., the user's college football team) is ongoing and offer a discount on a meal. In this manner, highly customized advertisements may be sent to individual users.

In some situations, the user may not be within range of the short-range communication network 116 of the restaurant, but may still be nearby. Because the wireless communication devices in the various short-range communication networks 116 relay messages, any message from a particular user may be relayed to the retail business via one or more short-range communication networks 116. Thus, a business at one end of a mall may detect the arrival of a particular user at the opposite end of the mall and still transmit a customized advertisement message to that user.

Figure 5:
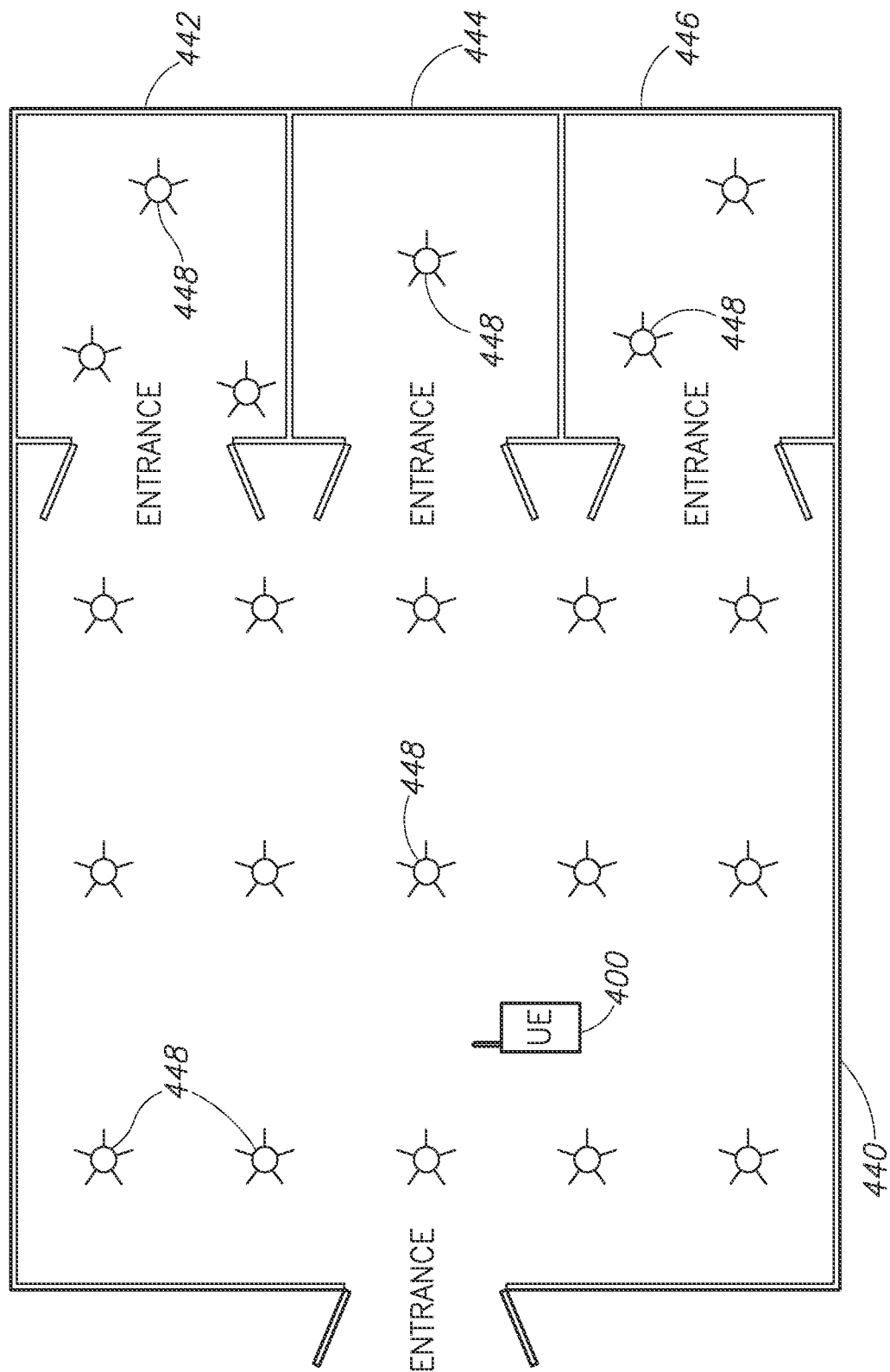
FIG. 5 illustrates a venue with a large number of distributed wireless access points.

FIGS. 3 and 4 illustrate a single access point to facilitate communication between ones of the wireless communication devices. However, in a different embodiment, a particular location may have a large number of access points to facilitate communication between the venue and a large number of individual wireless communication devices. FIG. 5 illustrates a large venue 440, such as a casino. In such a large venue, there may be related businesses 442-446 located within or near the venue 440. In the casino example, the related business 442 may be a performance venue for singers, comedy acts, and the like. The related business 444 may be a nightclub while the related business 446 may be a restaurant.

Due to the large size of the venue 440, it may be necessary to deploy a network of APs, illustrated by the reference number 448. The position and coverage area of the APs 448 can be determined based on the particular hardware implementation. The actual distribution and installation of the APs 448 within the venue 440 is within the engineering knowledge of one skilled in the art and need not be described in greater detail herein.

Figure 6:
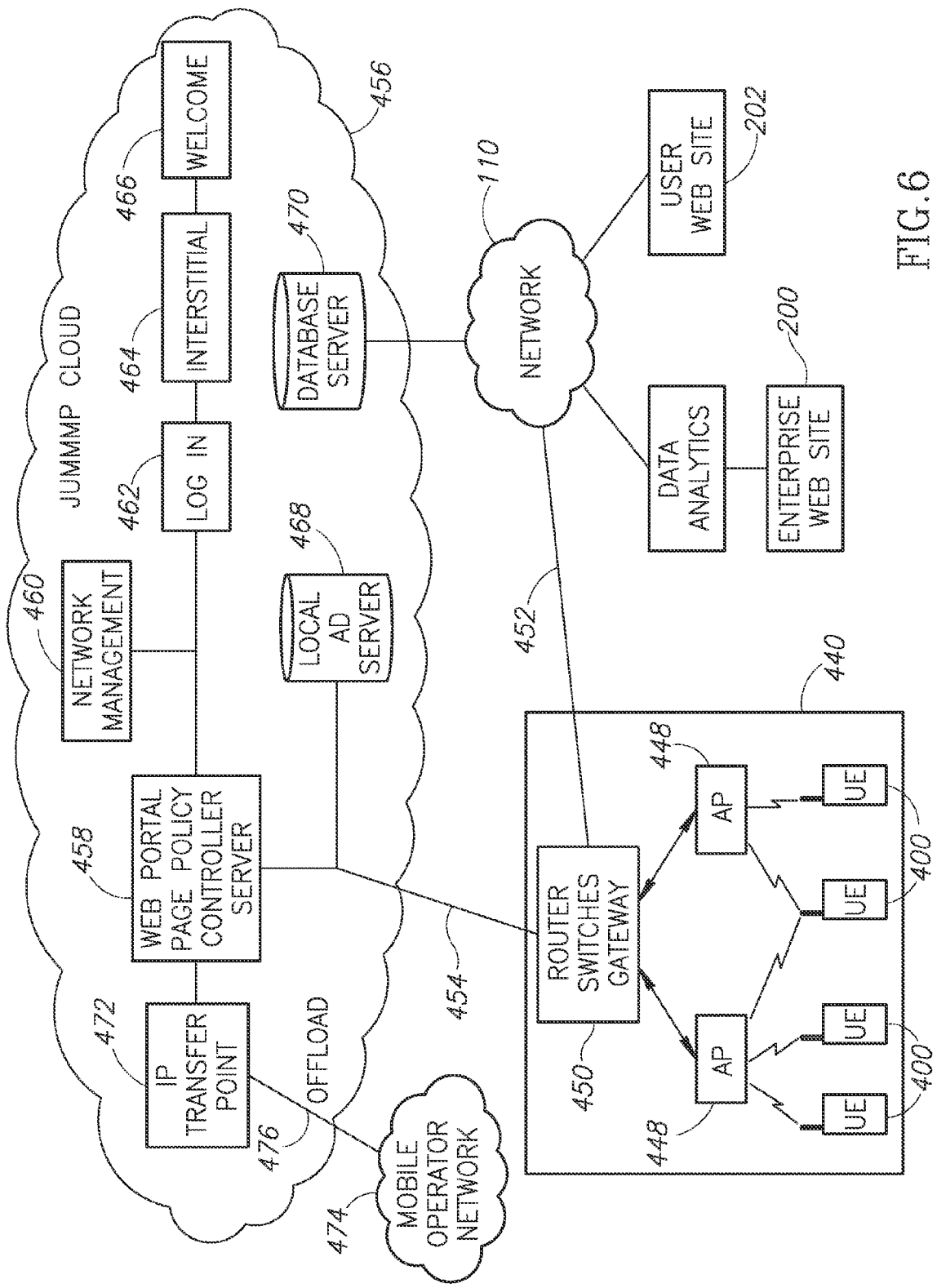
FIG. 6 illustrates a system architecture in which a venue communicates with a Cloud network.

In the embodiment of FIG. 5, all of the APs 448 may be coupled to a routing infrastructure 502 (see FIG. 8) or a gateway 450 (see FIG. 6). As the UE 400 moves throughout the venue 440, it is making and breaking connections between the UE 400 and one or more of the APs 448. Even though the UE 400 is making and breaking connections between specific ones of the APs 448, the UE maintains a continuous communication link with the venue 440 via the APs so long as the UE is within range of at least one AP. The identity of the UE 400 can be verified by the UE providing a profile and user information and signing up for the WiFi service and downloading an application program interface (API) in exchange for free WiFi service. Initially this may be accomplished through a portal page, as will be described in greater detail below. The API is a software program that aids in the authentication of the UE 400 and further facilitates communication between the UE 400 and the venue 440. The API also facilitates the exchange of Private Messages, Group Messages, and Public Messages between wireless communication devices and between the wireless communication device and an AP (e.g., one of the APs 448 in FIG. 5). As those skilled in the art will appreciate, the API is a software program but differs from a conventional smart phone application program in several ways. If the communication program implemented by API were implemented instead as an application program, its functionality would only be available to the user of the UE 400 while the application was actively executing. If the user wanted to run another application, they would have to shut down the communication application thus rendering the UE 400 unable to communication with the APs 448. In contrast, the API runs as a portion of the operating system that is effectively running in the background at all times. The user can select an application program that may be related to the communication or independent of the communication and the API will still be active even while the application program is running.

Once the identity of the UE 400 has been authenticated, the server 432 can provide customized messages to the owner of the UE 400. While the UE 400 remains within the venue 440, it is in substantially continuous contact with the APs 448 and may receive data therefrom. For example, the UE 400 could receive an ad for free or discounted tickets to the performance venue 442 or an invitation to happy hour at the nightclub venue 444 or a discounted meal at the restaurant venue 446. If the owner of a UE 400 is not a registered guest at a hotel within the venue 440, the APs 448 could send an invitation or ad to book a room in the venue 440. The UE 400 can communicate with the server 432 via the APs 448 to accept one or more of the ad offers. For example, the UE 400 could transmit an acceptance and book tickets at the performance venue 442. Similarly, the user of the UE 400 can book a room in the venue 440.

The venue 440 can establish virtually continuous wireless communication links with the UE 400 and provide a stream of ad content (e.g., ads, offers, discounts, etc.) for the venue 440 and the related businesses 442-446. Thus, the stream of ad data to the UE 400 may be for the venue 440 and the related businesses 442-446. Alternatively, the venue 440 may provide advertising for a different venue (not shown). For example, if the venue 440 is a casino in a large city, such as Las Vegas, the server 432 may provide ad content for a related business down the street or even for a third-party business with whom the venue 440 has contracted to provide advertising to the UE 400. For example, the AP 448 may provide advertising for a convention at a different venue or for a boxing match at a different venue. Thus, advertising content may or may not be related to the venue 440 in which the UE 400 is presently located.

FIG. 6 illustrates a system architecture that allows operation of the system across multiple venues. In FIG. 5, the venue 440 is illustrated with a limited number of UEs 400 and a limited number of APs 448. As discussed above with respect to FIG. 5, the venue 440 may have a large number of APs 448 distributed throughout the venue. The various APs are coupled together using routers, switches, and the like. Those routers, switches and gateways are illustrated in FIG. 6 by the reference 450. Among other things, the gateway 450 allows an interconnection to the network 110 via a communication link 452, but could be any wide area network. In a typical embodiment, the network 110 may be implemented as the Internet. In addition to the communication link 452, the gateway 450 provides a backhaul 454 to a cloud computing environment designated as a JUMMMP Cloud 456. The backhaul 454 may be implemented in a variety of different manners using known technology. In one embodiment, the backhaul 454 may be routed to the JUMMMP Cloud 456 via the network 110.

Within the JUMMMP Cloud 456 are a number of components. A web portal page and policy controller server 458 controls user authentication across a number of different venues in addition to the venue 440. A network management element 460 controls overall operation of the network in the JUMMMP Cloud 456.

FIG. 6 illustrates a number of different web pages that may be downloaded to the UE 400 in the venue 440. In one embodiment, the venue 440 may include its own server and store its own portal pages. However, such an architecture requires that each venue have a separate server to support this functionality. The system in FIG. 6 advantageously utilizes the web portal page server and policy controller server 458 for multiple venues. The JUMMMP Cloud 456 may have some common pages for all venues, such as a log-in web page 462. However, even the log-in web page may be unique to the venue 440.

In addition to the log-in web page 462, the JUMMMP Cloud 456 may have one or more interstitial web pages 464. For example, interstitial web pages may display information about the venue 440 (or advertising for businesses within the venue, third party advertising, or advertising for other venues within the JUMMMP network) while the user is waiting for completion of the registration verification process. In addition, the JUMMMP Cloud 456 may include one or more welcome web pages 466. The welcome web pages 466 may offer various services, such as a credit card data entry page, and Internet access sign-up page, a voucher code entry page to permit the user to enter discount voucher data, and the like. For example, the initial registration can provide WiFi connectivity at a certain service level, such as a basic bandwidth. However, the welcome pages may include an offer to upgrade WiFi connectivity to a higher bandwidth for an advertised price. If the user is a guest at the venue 440, the charge can be automatically made to the user's room. In another embodiment, the user's phone may be charged for the upgraded bandwidth service. Other similar services may be provided in the welcome web pages 466.

One skilled in the art will appreciate that the interstitial web pages 464 and the welcome web pages 466 may be unique to the venue 440. Even though these web pages may be unique to the venue, the centralized web portal page server 458 within the JUMMMP Cloud 456 simplifies the overall system architecture within the venue 440 and within other venues by eliminating the need for a portal page server within each venue.

A local ad server 468 in the JUMMMP Cloud 456 may provide ads for the venue 440. As discussed above, the ads may be for the venue 440 itself or for the related businesses 442-446 (see FIG. 5). In addition, the ads may be for businesses near the venue 440 (or for other venues in the JUMMMP network). Although the ad server 468 may be located within each venue 440, the centralized ad server 468 in the JUMMMP Cloud 456 simplifies the network architecture within the venue 440 and other venues by eliminating the need for an ad server within each venue.

A database server 470 in the JUMMMP Cloud 456 may be configured to collect a broad range of information regarding the UEs 400 (including the user profile information from the data storage area 184 (see FIG. 2) that was provided when the UE was first identified in the venue 440. The profile information will help provide targeting marketing and advertising to the UE 400 as it traverses the venue 440). As previously discussed, data messages may include geo-location data. The geo-location data (e.g., longitude and latitude) can be obtained in several possible ways. In one embodiment, the wireless communication device (e.g., the UE 400 in FIG. 6) may have built-in GPS. Other possible location determination technologies include WiFi, 3G, approximation triangulation, or last-known location of the user. Other known location technologies may also be implemented in the system 100. For example, the UE 400 will communicate with different ones of the access point 448 in the venue 440 shown in FIG. 5. As the UE 400 moves throughout the venue, new communication links are established with nearby access points 448. By identifying which access point 448 the UE 400 is communicating with, it is possible to determine the location of the UE 400 with a reasonable degree of accuracy. The database server 470 is configured to store location information, along with time/date data to thereby track movements of the UE 400. In one embodiment, the database server 470 can also be configured to store message data from the UEs 400 throughout the system 100. In yet another embodiment, the database server 470 may also store user profiles for the UE 400 as well as profile data collected by the UE 400 from other JUMMMP users. In one configuration, the API, which is installed on the UE 400 as part of the verification process described above, is configured to generate a "heartbeat" signal that periodically reports location data back to the database server 470. The location data may include a time/date stamp to provide location information for the UE 400. This information can be useful for marketing purposes. Using the example of FIG. 5, where the casino venue 440 includes a large area as well as related businesses 442-446, the database server 470 can determine how long the UE 400 remains in a particular area (e.g., one area of the casino), how many times and how long the UE remains at the bar, in a nightclub or the like. By collecting this information, the database server 470 can establish a user profile for the UE 400 for marketing purposes.

The JUMMMP Cloud 456 also includes an IP transfer point 472, which is coupled to a mobile operator network 474 via a communication link 476. As those skilled in the art will appreciate, mobile data offloading, also called data offloading, involves the use of complementary network technologies for delivering data originally targeted for cellular networks, such as the mobile operator network 474. In areas where the cellular network traffic is heavy, network congestion may occur. To reduce congestion, mobile network operators sometimes set up WiFi access points in areas of congestion and allow some of the data originally targeted for the mobile operator network 474 to be carried by the WiFi network. Rules triggering the mobile offloading action can be set by an end user (i.e., the mobile subscriber) or the mobile network operator. The software code operating on the offloading rules can reside in the UE 400, in a server, or divided between these two devices. For the end users, the purpose of mobile data offloading may be based on the cost for data service and the ability of higher bandwidth. For mobile network operators, the main purpose for offloading is to reduce congestion of the cellular network. The primary complementary network technologies used for mobile data offloading are WiFi, femtocells, and integrated mobile broadcast.

In a typical embodiment, each mobile network operator has its own WiFi network to offload data that would otherwise be carried on its particular mobile operator network. In the context of FIG. 6, the APs 448 within the venue 440 do not belong to the operator of the mobile operator network 474 as is normally the case in data offloading. In the implementation described in the present disclosure, the data offloading is provided by the venue 440 through contract with the mobile operator network 474. Although FIG. 6 illustrates only a single mobile operator network 474, those skilled in the art will appreciate that it is representative of one or more mobile operator networks. In operation, each mobile operator network contracts with the venue 440, either directly or with the JUMMMP Cloud 456, to provide data offloading in the venue. When the UE 400 enters the venue, the mobile network operator is notified and the mobile operator network 474 can determine whether or not to offload data traffic for that UE. If data offloading for the UE is approved in accordance with the rules described above, Internet access, text messaging, and even telephone calls can be provided to the UE 400 via a connection from the mobile operator network 474 through the communication link 476 to the IP transfer point 472 within the JUMMMP Cloud 456. In turn, that offloaded data is routed through the backhaul 454 to an AP 448 and ultimately to the UE 440. Similarly, outgoing calls from the UE 400 may be routed in the reverse fashion. This approach has the beneficial effect of offloading traffic from an otherwise congested mobile operator network 474. In addition, the mobile network operator may find improved performance because direct communication with the UE 400 through a base station (e.g., the base station 104 in FIG. 1) may not work well when the UE 400 is inside a building, such as the venue 440. Thus, improved reception and reduction in network congestion are double benefits of the IP offloading provided by the JUMMMP Cloud 456.

In the embodiment of FIG. 6, the policy controller server 458 may function as an authentication server to assure the authentication of the UE 400. Those skilled in the art will appreciate that the components shown in the JUMMMP Cloud 456 are illustrated as individual elements. In one embodiment, a single policy controller server 458 may be sufficient for a large area, such as the entire country. Indeed, in one embodiments, a single policy controller server 458 may provide registration services for the entire system 100. However, those skilled in the art will appreciate that the policy controller server 458 may be illustrative of a number of different computing platforms designed to implement the functionality of the policy controller server. In one embodiment there may be a policy controller server for large cities, individual states, regions of the country, or an entire country. In another embodiment, the policy controller server 458 may be implemented in a hierarchical fashion where a local or regional policy server controller 458 contains local and regional data, but may communicate with regional or national policy controller servers 458 on a higher hierarchical level. For example, if the UE 400 performs an initial registration in one city, that registration data may be stored in a local implementation of the policy controller server 458 and reported to a regional or national level of the policy controller server. In this manner, the registration data may be efficiently distributed throughout a wide area. As will be discussed in detail below, this arrangement also facilitates easy subsequent authentication of the UE 400.

The UE 400 must perform an initial registration with the system 100 at some point in time. The initial registration can be performed remotely using, by way of example, a laptop or PC connected to the JUMMMP Cloud 456 via the network 110. In another variation, the UE can perform an initial registration as it enters the venue 440 illustrated in FIG. 6, as described above. When the UE 400 initially contacts any of the APs 448, the policy controller server 458 will not have any data related to a particular UE 400. In this case, that initial AP 448 in the venue 440 may perform an initial registration. For the initial registration, the UE 400 can connect to the initial AP 448 and provide identification information. In an exemplary embodiment, the user can complete the initial registration process by providing data, such as the telephone ID (e.g., the phone number), a device ID, a user ID, and an email address as well as other information, such as the user profile in the data storage area 184 (see FIG. 2). The user ID may be a user generated name, nickname, or the like. The device ID may vary based on the particular type of the UE 400. For example, if the UE 400 utilizes an Android™ operating system, the device will be assigned an Android™ ID. In addition, the UE 400 may typically be assigned an international mobile equipment identification (IMEI). Any of these device identifications alone may be transmitted to the registration server 458. In another alternative embodiment, a unique hash of one or more device IDs may be generated and transmitted to the registration server 458 as the device ID. The short-range transceiver 176 (see FIG. 2) may also include an identification, such as a MAC address that is unique to the UE 400. The registration data described above can be provided to the registration server 458 along with the MAC address. The registration data may be stored in association with the MAC address.

As part of the registration process, the API is downloaded and installed on the UE 400. As discussed above, the API provides the communication functionality to the UE 400.

Once the initial registration process has been completed, subsequent authentications are greatly simplified. Once the initial registration process is completed, the web portal page server 458 may transmit other pages, such as the log-in web page 462, one or more interstitial web pages 464, and the welcome web page 466 shown in FIG. 6.

The UE 400 can also perform the initial registration using a conventional wireless service provider network. As previously discussed the UE 400 can communicate with the PLMN 102 (see FIG. 1) in a conventional manner. Those skilled in the art will appreciate that the UE can access the network 110 via the PLMN 102. Conventional wireless service provider components, such as the gateway 108 to the network 110 are known in the art, and need not be described in greater detail herein. In one embodiment, the UE 400 can perform a registration process with the registration server 458 (see FIG. 6) via the RAN 102. In this embodiment, the UE 400 accesses a website, such as the JUMMMP network website 200 illustrated in FIG. 3. In this example, the registration server 458 may be associated with the JUMMMP network website 200 (see FIG. 3) or the JUMMMP Cloud 456 of FIG. 6.

Alternatively, the UE 400 may perform an initial registration using a conventional computer (e.g., the user computing device 112 of FIG. 1) to provide the registration data for the UE 400 to the policy controller server 458 or registration server 460. For example, the user may make a reservation to visit a hotel, such as the casino venue 440 illustrated in FIG. 5. In a confirmation email from the hotel, the user may be invited to perform a registration process with the registration server using, by way of example, a link to a registration web page. If the user has previously registered the UE 400 with the policy controller server 458, the user can simply provide a message to the policy controller server 458 that the user (and the UE 400) will soon be in Las Vegas. The policy controller server 458 can download the authentication information to the local or regional registration server associated with the geographic locale of the casino venue 440. In addition, the registration server 458 may preload the data in the Allowed List 184a and the Blocked List 184b in the UE even before the UE 400 arrives in Las Vegas.

If the UE registration occurs at the venue via an AP (e.g., the AP 448 in FIG. 6), the policy control server 458 knows the geographic locale of the UE 400. The downloaded data for the Allowed List 184a (see FIG. 2) and the Blocked List 184b are lists of authenticated and unauthenticated APs in the geographic region in which the UE 400 is presently located. In this manner, the UE 400 knows that information, such as messages, coupons, advertisements, and the like are received from valid and registered businesses. At the same time, the UE 400 will block such data if the AP sending such data is in the Blocked List 184b.

In one embodiment, a previously-registered UE 400 may come within range of any of the APs 448 in the venue 440 of FIG. 6 and establish a wireless communication link therewith. In establishing the communication link, the UE 400 transmits its MAC address and/or other forms of identification, such as the phone ID or IMEI, the device ID, the user ID or the like, either alone or in combination. The AP 448 transmits an authentication request message to the registration server 458 to determine whether the UE 400 is a registered device. Based on the MAC address or other device identification data, the registration server can confirm that the UE 400 has previously registered. Thus, the UE 400 is authenticated whenever it comes into range of an AP 448 of the system 100. This may occur transparently to the user. This automatic authentication process can occur even if the initial registration was in a completely different part of the country. Thus, the UE 400 may move from one venue 440 to another in the same city or region or may be in a completely different part of the country and be automatically identified and authenticated with APs that are part of the JUMMMP network. This convenient registration and authentication avoids the need for constantly searching for a WiFi connection as required by other systems. Based on this automatic authentication process, the UE 400 may be automatically connected to the WiFi network created by the APs 448 in the venue. The UE 400 may get welcome greetings from the venue and may also receive advertising, offers, discounts, and the like.

Figure 7:
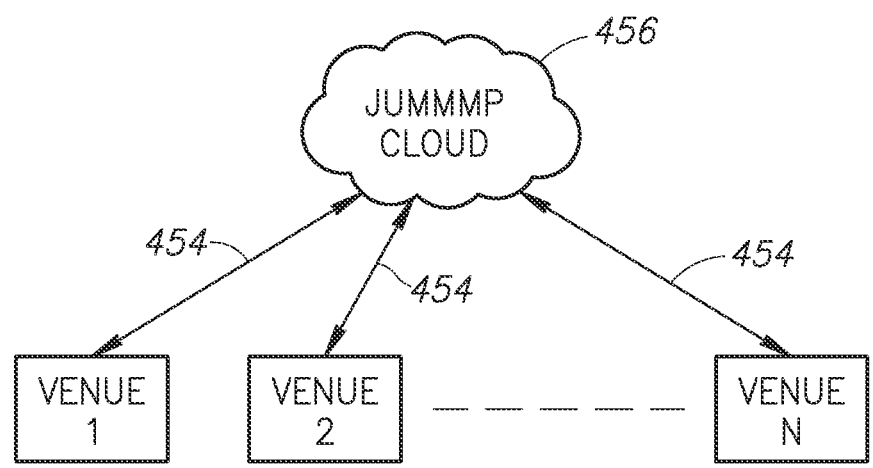
FIG. 7 illustrates the Cloud network of FIG. 6 communicating with multiple venues.

The registration process at a single venue has been discussed above with respect to FIG. 5. The JUMMMP Cloud 456 also advantageously provides a centralized registration function for multiple venues, as illustrated in FIG. 7. The multiple venues 440 are each connected to the JUMMMP Cloud 456 via individual respective backhauls 454. If a UE 400 initially registers at Venue 1, using the registration process described above, that registration information is stored in the JUMMMP Cloud 456. At a later point in time when the user enters, by way of example, Venue 2 illustrated in FIG. 7, the UE 400 will automatically identify the AP 448 and begin to communicate therewith. Because the UE 400 has already been registered, that information is passed along to the JUMMMP Cloud and the UE 400 is automatically authenticated for its new current location. This is true even if the various venues 440 are located far from one another. For example, an initial registration of the UE may take place at a sports venue in, by way of example, New York City. However, if the UE 400 is carried to a casino in, by way of example, Las Vegas, Nev., the UE 400 will automatically begin to communicate with the AP 448 in the new venue in Las Vegas. Because each venue is coupled to the JUMMMP Cloud 456, the UE 400 need not undergo another registration process when it enters the venue 440 in Las Vegas. Thus, a single registration process at any venue is sufficient for registration with the JUMMMP Cloud 456. Whenever the UE 400 goes into a different venue 440 that is coupled to the JUMMMP Cloud 456, the UE 400 is automatically recognized and authenticated. During the automatic authentication process, the JUMMMP Cloud 456 may provide interstitial portal pages 464 to the UE 400. Upon completion of the automatic registration process, welcome portal pages 466 may then be transmitted to the UE 400. Thus, even though the venues 1-N may be separate entities in completely different locations, they may all be considered part of a JUMMMP network because they are all coupled to the JUMMMP Cloud 456 and rely on the capabilities of the JUMMMP Cloud for at least the registration and authentication purposes. Furthermore, as described above, the venues may rely on the JUMMMP Cloud 456 to generate targeted advertising for the UE 400 based on the profile information, user location information, and the like.

In another aspect, the wireless communication system described herein is configured to permit gaming (i.e., gambling) using the short-range communication networks 116. In many jurisdictions, gambling with real money is limited to licensed establishments. The process of exchanging game play data described herein can be implemented directly between wireless communication devices for fun, which is not limited to licensed gaming establishments. However, the process described herein is also applicable to licensed gaming establishments, such as the Casino venue 440 in FIG. 5. With respect to FIG. 5, the UE 400 communicates directly with one or more of the APs 448 using the techniques described above. Because the communication networks 116 are short-range communication networks, communication between the UE 400 and the APs 448 is limited to the confines of the venue 440 and thus can be configured to meet the legal requirements of gambling only on the premises of the licensed establishment.

Figure 8:
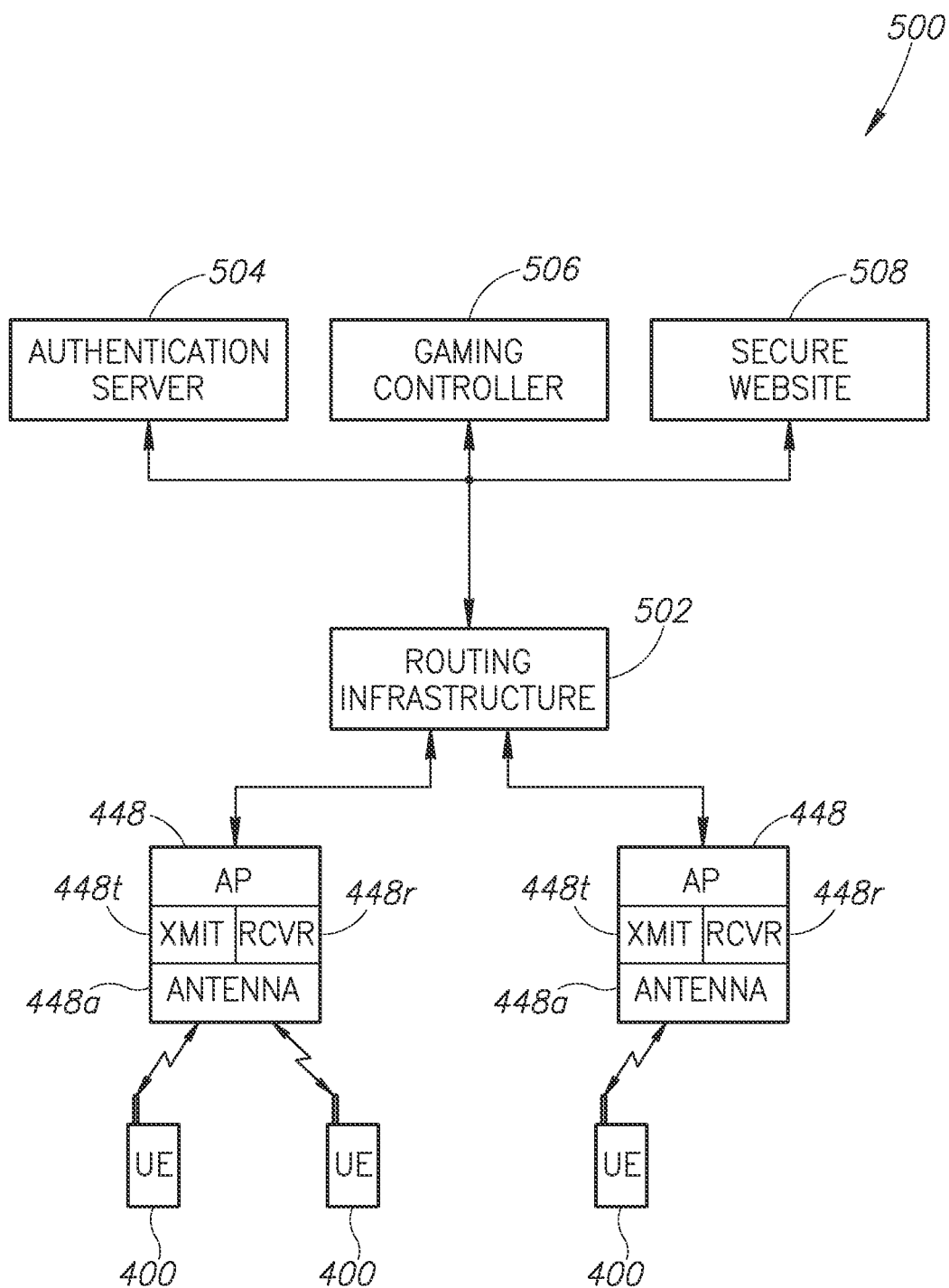
FIG. 8 is a functional block diagram of a system to implement gambling using wireless communication devices.

FIG. 8 illustrates a functional block diagram of a system 500 that can be implemented within the venue 440 (see FIG. 5) to permit gambling using the UE 400. In the example of FIG. 8, the UEs 400 are connected to ones of the APs 448. Those skilled in the art will appreciate that the UE 400 will communicate with one or more of the APs 448 based on signal characteristics, such as signal strength, data error rates, and the like. As will be described in greater detail below, the UEs 400 participating in a particular game do not have to be connected to the same AP 448.

Each AP 448 comprises a transmitter 448t, a receiver 448r, and an antenna 448a. Those skilled in the art will appreciate that the transmitter power for the APs may be adjusted to create the desired coverage area. For example, the transmitter power may be increased to expand the coverage area for a particular AP 448 or may be reduced to cause a corresponding reduction in the area of coverage for a particular AP. Those skilled in the art will appreciate that many APs 448 have an omnidirectional antenna 448*a*. Newer versions of APs 448 may include multiple antennas for both the transmitter 448*t* and receiver 448*r* within the AP 448. This technology, sometimes referred to as multiple input-multiple output (MIMO) may provide more reliable reception. In addition to omnidirectional antennas, the antenna 448*a* for a particular AP 448 may be configured to have a desired shape other than the omnidirectional pattern described above.

The plurality of APs 448 are coupled to a routing infrastructure 502. Like the router, switches, gateway 450 in FIG. 6, the routing infrastructure 502 comprises routers, switches, gateways, firewalls, and the like. The implementation of the routing infrastructure 502 in connecting a plurality of the APs 448 is within the scope of knowledge of ordinary skill in the art and need not be described in greater detail herein.

The routing infrastructure 502 couples the APs 448 to an authentication server 504 and a gaming controller 506. As can be appreciated, it is important to authenticate each UE 400 that will participate in gambling activities. The authentication process has already been discussed in detail above with respect to FIGS. 6-7. In one embodiment, the initial registration and authentication can occur when the UE 400 first enters the venue 440. This process is described above. Furthermore, if the UE 400 was previously registered, even at a different venue, such as the Venue 2 in FIG. 7, the UE 400 can be automatically authenticated when the user enters the venue 440 if the authentication process occurs in the JUMMMP Cloud 456. Thus, the authentication server 504 may be a local server within the venue 440 or may be part of the JUMMMP Cloud 456. As discussed above, the web portal page policy controller server 458 can function as the authentication server in the JUMMMP Cloud 456. The web portal page server 458 controls the display of log-in web pages 462, interstitial web pages 464, and welcome web pages 466, as described above. Part of those series of web pages may include an option for the UE 400 to register for gaming activities. The user may apply for gambling credits using a credit card account as described above with respect to the initial authentication process. The user may select a desired amount of gambling credits to be credited to a player account so that each round of betting does not require the further exchange of credit card information. As discussed above with respect to credit card registration, all financial information is encrypted prior to transmission from the UE 400 to the JUMMMP Cloud 456. In an exemplary embodiment, the player account can function as a virtual player's card. During each round of gambling, the bets, winnings, and losses can be allocated to the player account. As will be discussed in detail below, the gaming player can also accrue rewards points that can be redeemed as gifts from the venue 440.

Once the user has gambling credits in their player account, the user may select from a number of different possible games. The games may generally fall into two categories. In the first category, each individual player is playing against the house (i.e., the gaming establishment). For example, Keno, roulette, slot machines, blackjack, and the like are played between the user and the house even though each game may have a large number of participants. The second category of games are ones in which the player competes against other players. For example, various poker games are played between the individual players with the house acting as the dealer. As will be described in detail below, both categories of games may be readily implemented with the present system.

The system 500 also includes the gaming controller 506 to control actual operation of the gaming events. In an exemplary embodiment, the gaming controller may be implemented as a conventional computer server configured to communicate with multiple ones of the UEs 400 and further configured to play multiple different games. The gaming controller 506 includes conventional computer components, such as a processor, memory, data storage (e.g., a disk and/or optical data storage), network communication interfaces, and the like. In a typical embodiment, the gaming controller 506 may also include conventional computer components, such as display, keyboard, cursor controller, and the like. The operation of these conventional computer elements is well known in the art and need not be described in greater detail herein except as to the nature of the game play data communication between the gaming controller and the various UEs 400.

Although FIG. 8 illustrates only a single gaming controller 506, those skilled in the art will appreciate that the venue 400 may include one or more gaming controllers 506 based on the volume of gambling that occurs within the venue 440. More popular gambling games may require more gaming controllers 506 while other gaming controllers 506 may be used to control a number of smaller games or games that do not require as great a degree of real-time or near real-time communication. For example, Keno only requires occasional game play data to be transmitted from the UE 400 to the gaming controller 506 and game play data messages from the gaming controller 506 to the individual UEs as the numbers are drawn for each Keno race. Similarly, a single slot machine only requires occasional game play data, such as the dollar amount to be bet and a "start" command to be transmitted from the UE 400 to the gaming controller 506 and occasional game play data messages from the gaming controller 506 to the UE 400. However, slot machines differ from a game such as Keno because each slot machine is, in effect, a separate game played between the UE 400 and the house. Thus, the gaming controller 506 must be capable of maintaining a large number of communication links for a plurality of slot machine gaming activities.

In one embodiment, the game play using the system 500 may be virtual game play entirely controlled by the gaming controller 506. For example, roulette could be played with the gaming controller 506 generating simulated spinning of the roulette wheel and the virtual ball dropping into a randomly selected slot on the wheel. In an alternative embodiment, the system 500 may permit the UEs 400 to participate in actual casino game play. Using the example of roulette, the UE 400 may place a bet in the normal manner, but may view an actual video of a roulette wheel in the casino as the wheel spins and the ball drops into one of the slots. In this embodiment, the player participates in an actual game and may see real time video of the game play or an electronic simulation of actual game play where a virtual roulette wheel may spin in synchrony with the actual wheel at a particular location within the casino and a virtual ball drops into a virtual slot as the real ball drops into the same slot on the actual roulette table.

Software applications to play the various games must be downloaded to the UE 400. The various games may be downloaded as separate application programs or downloaded as a single application program containing multiple games. For example, a single application program may contain a variety of different poker games. In another example, a single software application program may contain a variety of slot machine games.

In one embodiment, the software application programs are downloaded to the UE 400 via the APs 448 within the venue 440 itself. However, some UE 400's require downloads directly from the smart phone vendor's website. In this case, it is possible to download a version of the games that will permit playing with no gambling. It is only upon entering the casino venue 440 of FIG. 5 that the gambling features of the application program may be enabled. In another embodiment, only a communication shell for gambling may be downloaded to the UE 400. This communication shell can be downloaded from the APs 448 in the venue 440, as described above, or downloaded from an application store operated by a smart phone vendor. In either case, the communication shell is incapable of operating in a gambling mode by itself. Rather, the communication shell works only in conjunction with the APs 448 in a licensed gambling establishment. In this embodiment, the gaming controller 506 executes the software for the actual gambling activity (e.g., slot machine, roulette, poker, and the like). The communication shell is configured to display data options for the user to select a desired game, to place bets, view results, and the like.

For example, the communication shell could download the "skin," or display appearance, of a slot machine selected by the user from among a plurality of possible slot machine games. The communication shell is configured to display the selected game and to permit the user to interact with the game. The advantage of this approach is that the game may be more closely controlled by operating only in conjunction with the gaming controller such that the gaming controller 506 actually stores the software for the individual games. Another advantage is that the user need only download the communication shell to enable the possibility of a variety of gambling games. This would require only a single download from an application store and a single fee associated with the communication shell. The consumer benefits by having to download fewer individual game application programs from the smart phone vendor's application store. In addition, the communication shell can allow the UE 400 to access the gambling website of the casino on the gaming controller 506.

In an alternative embodiment, the communication shell in the UE 400 may be used to access and communicate with a secure website 508 located at, and controlled by, the venue 440 (see FIG. 5). The communication shell permits the UE 400 to communicate with the AP 448 in the manner described above. However, rather than direct access to the gaming controller 506, the communication shell permits a web browser function on the UE 400 to access the secure website 508. Those skilled in the art will appreciate that communication with the secure website 508 can be established using a secure communication socket such as, by way of example, https protocol to provide the desired security. The actual communication between the UE 400 and the secure website 508 may be accomplished using conventional communication protocols, such as TCP/IP.

In this embodiment, all gaming operations are conducted by the secure website 508. For example, the UE 400 may view an initial web page at the secure website 508 to select a particular gambling activity (e.g., slot machine, roulette, poker, and the like). Those choices may typically be displayed on the UE 400 in the form of links that are selectable by the user. If, for example, the display 154 (see FIG. 2) of the user selects a link labeled "slot machines," the secure website 508 may download data to the browser on the UE 400 to provide additional links for each of the available slot machine games. Again, the user may select a particular slot machine game by selecting one of the links. Similarly, the user can select an amount to bet using other links, or by entering a numeric value in a designated location on the display 154 of the UE 400.

Those skilled in the art will appreciate that the secure website 508 may download a plurality of data files to the UE 400 with different data formats, as is customary with any website. For example, the secure website 508 may download data files using a TIF, GIF, JPEG, flash, or other file types, alone or in combination. The present invention is not limited by the specific type of data file downloaded from the secure website 508 to the UE 400. As is known in the art, the web browser in the UE 400 renders the various file types on the display 154 (see FIG. 2) to provide the user with a realistic gaming experience. In an exemplary embodiment, the gambling operations conducted via the secure website 508 are visually, audibly, and functionally equivalent to a similar software application program downloaded to the UE 400 and executing locally on the UE. The goal is to provide the same gaming experience to the user irrespective of the actual location of the game application software. Thus, the user will have the same gaming experience if the software application is downloaded to the UE 400, or if the software application is executing on the gaming controller 506 and the UE 400 simply has a communication shell to interact with the gaming controller 506, or if the communication shell on the UE 400 communicates with the secure website 508.

With the secure website 508, the virtual player's card and player account information is stored on the secure website. Because the secure website 508 is tied into the authentication server 504 and gaming controller 506, information regarding the user of the UE 400 is readily available. This provides a simple way to increase the amount of money available for betting or to credit and debit the virtual player's account.

Each of the games are played in accordance with the game play rules for that game. The game play rules for various games are well known and need not be described in greater detail herein. For example, Keno games are conducted periodically. A player bets a user-selected amount and picks between 4 and 10 numbers ranging between 1 and 80. Every few minutes, a round of Keno, called a Keno race, is run and 20 numbered balls are drawn at random from a container holding the 80 numbered balls. The winnings for any individual Keno race are based on the number of numbers drawn that match the user-selected numbers.

Keno may be implemented using the wireless communication system by downloading a software version of Keno to the UE 400 in the manner described above. This permits a player to select 4 to 10 numbers ranging between 1 and 80. The user may also select a dollar value for the bet. As the Keno race is conducted, the selected numbers may light up on the display 154 (see FIG. 2) of the UE 400 and selected numbers that match the user-selected numbers may be highlighted in a different color. As each Keno race is concluded, a message may be sent to each UE 400 indicating whether or not there were any winnings. The winning dollar value, or loss, can be credited or debited to the appropriate player account. The downloaded game is properly encrypted so as to assure the legitimacy of game play. The user account will be verified before the game, and after each game, through connection to the gaming controller 560.

Roulette may be played in a similar fashion in accordance with roulette game play rules. In this implementation, a roulette software program may be downloaded to the UE 400 to allow the user to place bets in accordance with roulette game play rules. The roulette game play software may include a graphic simulation of the spinning roulette wheel that shows the ball dropping into a particular slot. Upon completion of a round, the UE 400 can receive a message indicating the amount won or lost. Again, the player account may be credited or debited to reflect the wins and losses.

Slot machines are also played in a similar fashion, but with one notable difference. While games such as Keno, roulette, craps, blackjack, and the like have a fixed set of rules and a fixed game board, slot machines are designed to provide variations in the look and feel of the game as well as game play rules. In an exemplary embodiment, the software application program for slot machines may provide a number of different "skins" to provide a number of games with a different appearance. In addition, the different slot machines may have different game play rules. For example, video poker is a form of slot machine game. Some slot machines have three spinning reels while others have five reels. The winning requirements can vary from one slot machine to another. Thus, there is no universal appearance for all slot machines nor a fixed set of game play rules that govern all slot machines.

Although it is possible to download each of these games to the UE 400, one approach is to use the communication shell described above to communicate with the secure website 508 (see FIG. 8). In this manner, the various games may reside on the secure website 508. This allows more rapid updates to changes in, by way of example, slot machines so that any UE 400 will have access to the latest or most popular games. In addition, the communication shell provides a secure communication link under control of the venue 440. The communication shell that accesses the secure website 508 can be configured in such a manner that the user cannot distinguish between playing the game as a downloaded software application on the UE 400 compared with accessing the same game through a connection to the gaming controller 506 or to the secure website 508 using the communication shell. Furthermore, there may be added security in retaining the player account, in the form of the virtual player's card, under control of the gaming controller 506 rather than residing locally on the UE 400.

The exchange of game play data for the first category of games (i.e., games played against the house) may be transmitted back and forth via Private Messages, as described above. Private Messages are designated for a single recipient and may also be encrypted for extra security. As with any online transaction involving money and/or personal information, it is important that the data be as secure as possible. In the case of gaming activities within the casino venue 440 (see FIG. 5), it is important that the APs 448 cannot be spoofed to a UE. That is, it is important that the UE 400 always be in communication with an authenticated AP 448 rather than a rogue AP or rogue mobile device posing as a valid AP to permit an unscrupulous individual to intercept communications from the UE. Similarly, it is important that the system not permit spoofing by a rogue UE such that the APs 448 are communicating with the authenticated UE 400 rather than a rogue UE operated by an unscrupulous individual. As described above, each UE 400 has been registered and authenticated locally in the venue 440 by the authentication server 504 (see FIG. 8) or on a multi-venue basis as described above with respect to the JUMMMP Cloud 456 (see FIG. 6). During the registration process, the authentication server 504 has captured all pertinent UE identifiers, which may be stored centrally in the JUMMMP Cloud 456. During subsequent authentication, the various UE identifiers can protect the network against a rogue UE. Additionally, the network of APs 448 and the information provided by the UE 400 to the system 500 can help detect the presence of a rogue AP within the network. A rogue AP can be located fairly quickly in the venue 440 due to the AP data provided to the authentication server 504 from multiple sources (e.g., multiple APs 448 that communicate with the UE 400). This data can be used to quickly find and eliminate any rogue APs operating within the venue 440.

In player vs. player games, such as poker, there may be a need for additional security in the exchange of game play data to prevent the inadvertent interception of game play data from one player by another competing player. For example, satisfactory operation of a poker game using the system 500 requires security for the game play data involving cards that are dealt face down to each player. This prevents the players from knowing what cards have been dealt to their opponents. The game play data requiring greater security may be transmitted in the form of Private Messages and, further, may be encrypted to prevent unauthorized interception. As described above, Private Messages are intended for a single recipient and can only be processed by the intended recipient using encryption/decryption methods known in the art. Other forms of game play data in a player versus player category may be transmitted as Group Messages. Using the example of a poker game, the betting that may occur after each round of cards are dealt must be known between the players as well as the house. In one embodiment, when a player makes a bet, the UE 400 for that player transmits the game play data to the gaming controller 506. In turn, the gaming controller 506 can transmit the betting game play data to others of the game play participants in the form of a single Group Message or individual Private messages to each player. In this manner, each of the players receives the betting data from the gaming controller 506. In this embodiment, all communications with the UEs 400 occur via the APs 448 and the gaming controller 506. This is true even if the UEs 400 are in close proximity with each other and may even be communicating with the same AP 448. This permits a greater degree of control of the game by the licensed establishment (i.e., the house). Furthermore, communication between the UEs 400 and the APs 48 is routed to the gaming controller 506. Thus, the UEs 400 participating in the same game need not be coupled to the same AP 448.

In a different form of communication, certain game play data may be made known to all players participating in the game. Using the poker example, it has already been described how cards dealt face down may be communicated to each individual player using Private Messages and/or encryption to prevent the unauthorized interception of that game play data. However, other cards in the poker game may be dealt face up so as to be visible to all game play participants. In this example, the game play data may be transmitted in the form of a Group Message designating each of the individual players in the game. Even with a Group Message, encryption may also be desirable for added security. Thus, the game play data may be transmitted back and forth between the UEs 400 and the gaming controller 506 using a combination of Public Messages, Private Messages, and Group Messages.

Alternatively, the UE 400 may have downloaded the communication shell, as previously described. In this embodiment, the game play is resident on the gaming controller 506 (see FIG. 8) and the communication shell serves to connect to an internal website at the venue 440. The communication shell permits the UE 400 to play the game as described above, with the game play software residing on the gaming controller 506. In yet another alternative embodiment, the communication shell can permit the UE 400 to gamble using the secure website 508.

Figure 9:
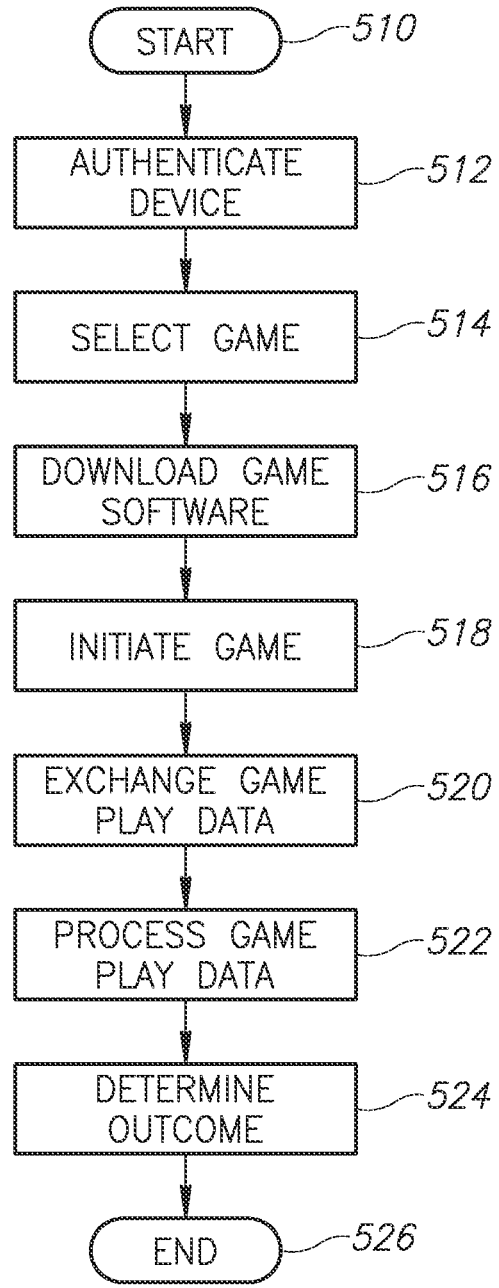
FIG. 9 is a flow chart illustrating the operation of the system of FIG. 8.

FIG. 9 is a flow chart illustrating the operation of the system 500 for wireless game play activities. At a start 510, the UE 400 may have just entered the venue or may have just been powered up by the user. In step 512, the system 500 authenticates the device. The process for the initial registration and authentication or automatic authentication of a previously registered UE 400 has been described above. In game play activity, it may be desirable to authenticate the UE 400 for each game (e.g., poker, roulette, etc.). Alternatively, the system 500 may wish to re-authenticate the device periodically (e.g., once per hour or once per day).

Following the authentication process, the user may select a game in step 514. In one embodiment, the venue 440 (see FIG. 5) may provide a web page that lists the available games as part of the welcome web pages 466 (see FIG. 6). These may be provided to the UE 400 as a link to a web page, or maybe a short program downloaded to the UE 400 to provide icons for each of the available games. With any of these implementations, the user selects the desired game in step 514 and, in step 516, the system 500 downloads game play software for the selected game using one of the APs 448. The downloaded games can have software certificates to verify that the downloaded application is valid and secure. As discussed above, the game software downloaded in step 516 can be provided directly by the gaming controller 506 or other source within the venue 440 or the JUMMMP Cloud 456 (See FIG. 6). In another embodiment, the software may be downloaded directly from an application store owned by the smart phone manufacturer. Furthermore, the game software may comprise the complete software to operate a game or may comprise the communication shell that allows the UE 400 to play a selected game where the software for the game itself may reside on the gaming controller 506. These variations are all readily implemented by the system 500.

In step 518, game play is initiated in accordance with the game play rules for the particular game. In step 520, the UEs 400 and the gaming controller 506 may exchange game play data. Those skilled in the art will appreciate that the type of game play data exchanged in step 520 is dependent on the particular game selected by the user. In games such as slot machines, the game play data may be initially transmitted from the UE 400 to the gaming controller 506 to select the dollar value for the bet and to initiate the start of the game. In turn, game play data for slot machines generated by the gaming controller 506 can include, for example, video effects data to show the reels spinning, lights flashing, and the like as well as audio data for sound effects. Alternatively, visual and audio sound effects may be generated by the UE 400 if the software application program is executed within the UE. The game play data from the gaming controller 506 may also include results data, such as the final value when the reels stop spinning, audio data to indicate a win or loss, and additional video effects data, such as lights and/or other action on the display 154 (see FIG. 2) of the UE 400 to accompany the results data.

As discussed above, the UE 400 may download the communication shell and thereby communicate with the secure website 508 at the venue 440. In this embodiment, the communication shell in UE 400 merely interfaces to the secure website 508 and all of the game play data is located on the secure website. The communication shell on the UE 400 simply communicates with the secure website 508 and the game play conducted on the secure website is displayed on the UE 400. In addition, the special effects, such as visual and audio effects described above, may be located on the secure website 508 and the communication shell on the UE 400 functions as a portal to the secure website.

In games such as Keno, roulette, and the like, the game play data may be initially transmitted from the UE 400 to the gaming controller 506 to select a dollar value for the bet and to select the number(s) on which the player is betting. In turn, the game play data generated by the gaming controller 506 may be results data, such as the selected Keno numbers in a particular Keno race, or the winning number in a roulette game, or the like. Thus, those skilled in the art will appreciate that the type of game play data generated by the UE 440 and the game play data generated by the gaming controller 506 will depend on the particular game selected by the user in step 514 as well as the nature of the software operating on the UE 400. For example, the UE 400 may have downloaded a complete software application program for a particular game, which would require relatively less game play data to be exchanged between the UE and the gaming controller 506. However, if the UE 400 has downloaded only the communication shell to enable communication with the gaming controller 506 to play the games, the gaming controller 506 may need to provide significantly more game play data to the UE 400 in the form of audio data, video data, and the like to effectively provide the user with a satisfactory gaming experience.

In step 522, the system 500 processes the game play data. In the example of Keno or roulette, the game play activity occurs in a single "round" where the outcome is determined after the simple exchange of game play data described above. In different games, such as poker, there may be multiple rounds of cards being dealt by the gaming controller 506 and multiple rounds of betting by the individual players in the game. Thus, steps 520 and 522 may be repeated depending on the nature of the game.

In step 524, the gaming controller 506 determines the outcome of the game and transmits game play data indicating the outcome to each of the UEs 400. In addition, the gaming controller 506 sends messages to credit or debit the individual players' accounts based on the determined outcome. The process ends at 526.

A system of game play using the APs 448 distributed throughout a venue has been described in detail above. There is also the option of the UE 400 downloading a software game and playing in a peer-to-peer fashion with other UEs 400 that may be in communication via the short-range communication network 116. In this embodiment, communications may be directly exchanged between the UEs 400 in a non-WiFi AP based network as opposed to game control through the gaming controller 506 and APs 448. In this scenario, the UE 400 checks in through the AP 448 before and after each game has been played to verify the credits and game wagers.

In this aspect, the gaming controller 506 is not actually involved with the playing of the game itself. Instead, software is downloaded to each of the UEs 400 involved in the game play and the game is played device-to-device in the ad hoc network described above with respect to the short-range communication networks 116. The direct peer-to-peer gaming application may relieve some traffic flow from the APs 448 and may result in a reduction of the number of gaming controllers 506 needed to support the venue gambling described above. The reason for this is that in a peer-to-peer environment, the game is managed locally through secure UDP broadcasts between the UEs 400. In the application requiring operation of the gaming controller 506 through the network of APs 448, each connection to the gaming controller 506 is encrypted and secured thus requiring additional server overhead. In contrast, a peer-to-peer communication network may allow gambling through direct communication between the UEs with only the results being reported to the gaming controller. Those skilled in the art will appreciate that this reduces the number of secure and encrypted messages that must be exchanged between the UEs 400 and the gaming controller

506 thus reducing the server overhead and possibly reducing the number of servers required for a full implementation.

As noted above, some gaming laws require that the gambling be conducted within the premises of a licensed facility. In this aspect, it should be noted that the gaming controller 506 and secure website 508 can be local to the venue (e.g., the venue 440 in FIG. 5) and the APs 448 are also local within the venue and thus the UEs 400 will be verified locally within the confines of the venue. This prevents possible GPS spoofing of the AP 448 to give a false location. This also prevents a rogue AP from intercepting data and/or attempting to change game results by sending false data to the UE 400 participating in the gaming activities.

Within the confines of the gambling area within the casino venue 440, it is legal to use a gambling software application if the game play data is exchanged through the AP network within the venue 440 and is controlled by the casino. The gambling software application programs may require certification by the State Gaming Commission. For example, a casino operating in Las Vegas may require a software application to be certified by the Nevada Gaming Commission.

Typically, the software application can only be used within a defined gambling area within the casino venue 440. As a result, games such as the slot machine application will effectively be "geo-fenced." In other words, the software application will only be allowed to operate in specific gambling areas within the casino. This geo-fencing can be determined using the existing AP locations within the venue 440. Once the UE 400 leaves the specified gambling area, the software application will automatically cease operation. Alternatively, the software application will automatically disconnect from the gaming controller 506 or secure website 508 (see FIG. 8).

Figure 10:
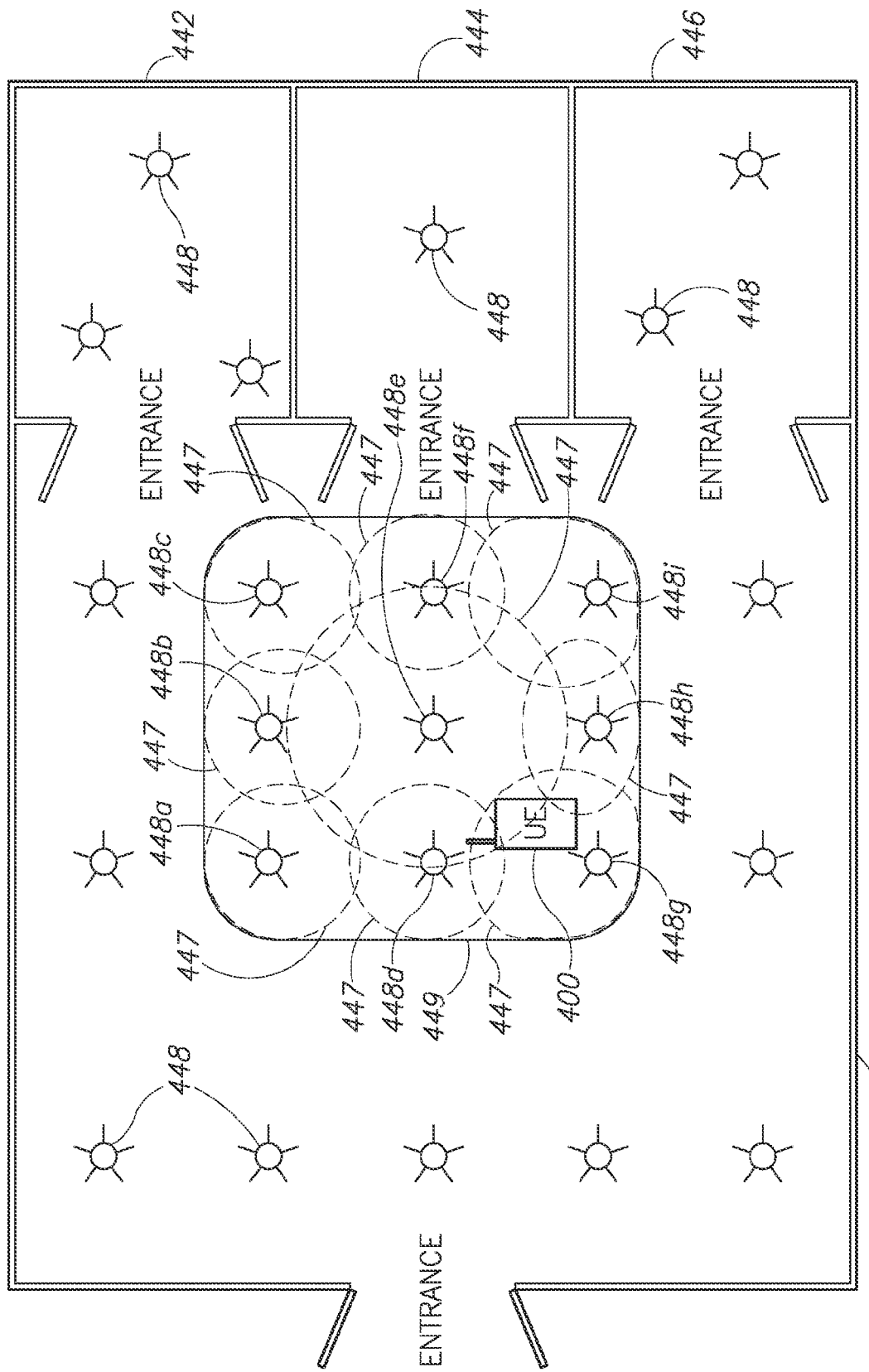
FIG. 10 illustrates the venue of FIG. 5 with a geo-fenced area.

An example of geo-fencing is illustrated in FIG. 10 where a group of APs 448*a*-448*i* each have areas of coverage 447 that collectively define a geo-fenced area 449. Those skilled in the art will appreciate that the area of coverage 447 for each of the selected APs 448*a*-448*i* can be enlarged or reduced depending on the transmitter power used by the transmitter 448*t* (see FIG. 8) in selected ones of the APs 448. For example, the APs 448*a*-448*c* each have an area of coverage 447 that is somewhat smaller than the area of coverage of the other APs 448 throughout the venue 440. In contrast, the AP 448*e* has an area of coverage 447 that is larger than the areas of coverage 447 for the other selected APs 448*a*-448*d* and 448*f*-448*i*. Because the AP 448*e* is centrally located within the geo-fenced area 449, it is possible to increase transmitter power to expand the area of coverage 447 for the centrally located AP 448*e*.

In addition to altering the size of the area of coverage 447, it is possible to selectively alter the shape of the area of coverage 447. For example, the selected APs 448*g*-448*i* are located near the periphery of the geo-fenced area 449. In the example of the selected AP 448*h*, the antenna 448*a* (see FIG. 8) may be configured to provide a generally ellipsoid coverage pattern. Although the coverage areas 447 in FIG. 10 are illustrated in two dimensions, those skilled in the art will appreciate that the coverage patterns are, in fact, three dimensional in nature. Similarly, the antennas for the selected APs 448*g* and 448*i* may be in the form of other shapes to provide the desired pattern for the respective areas of coverage 447. Thus, the size of the area of coverage 447 and the shape of the area of coverage 447 may be manipulated to selectively define the geo-fenced area 449.

As discussed above, the UE 400 may form a communication link with any of the APs 448 within the venue 440. However, the communication link with the APs 448 outside the geo-fenced area 449 cannot establish the gaming communication link with the gaming controller 506 (see FIG. 8) or the secure website 508. So long as the UE 400 is within the geo-fenced area, it will be communicating with at least one of the selected APs 448*a*-448*i*. Under these circumstances, the UE 400 within the geo-fenced area 449 can establish the gaming communication link with the gaming controller 506 or the secure website 508. It should be noted that the UE 400 may also use the selected APs 448*a*-448*i* for other communication purposes discussed above with respect to the others of the APs 448 throughout the venue 440. For example, a UE 400 within the geo-fenced area 449 can still receive offloaded mobile data traffic, ads, or other communications regarding show tickets, room discounts, dining discounts, and the like, in the manner described above. Thus, the selected APs 448*a*-448*i* function in the same manner as any other AP 448 within the venue 440. However, the APs 448 outside the geo-fenced area 449 are prohibited from establishing the gaming communication link with the gaming controller 506 or the secure website 508. Thus, any of the APs 448 or the selected APs 448*a*-448*i* can operate for the generalized communication with the venue 440, or the JUMMMP Cloud 456 (see FIG. 6) as described above. Only the selected APs 448*a*-448*i* are capable of establishing the gaming communication link to communicate with the gaming controller 506 or the secure website 508, for gambling purposes. So long as the UE 400 is within the geo-fenced area 449, it can maintain the gaming communication link with the gaming controller 506 or the secure website 508. However, as soon as the UE 400 leaves the geo-fenced area 449, it will no longer be communicating with any of the selected APs 448*a*-448*i*. Under these circumstances, the UE 400 will establish a communication link with one of the APs 448 outside the geo-fenced area 449 so that the UE 400 maintains a continuous communication link with the venue 440. However, the UE 400 cannot maintain the gaming communication link with the gaming controller 506 or the secure website 508 and cannot participate in the gambling activities.

When the UE 400 leaves the geo-fenced area 449, the gambling software application on the UE 400 terminates operation by terminating the communication link with the gaming controller 506 or the secure website 508. This occurs whether the software application program is downloaded and executing on the UE 400 or if the UE 400 is communicating with the gaming controller 506 or the secure website 508 using the communication shell, as described above. If the communication shell in the UE 400 is communicating with the secure website 508 using a web browser on the UE 400, the connection to the secure website is terminated.

In one embodiment, the geo-fenced area 449 can be set up as a gaming lounge, where users can come and play against the house (i.e., the venue 440) or against other players. Such operation is similar to existing lounge/bar areas currently in use in venues 440 for conventional gaming, such as blackjack, electronic games, and the like.

In another aspect, the venue 440 may provide reward points to the players. Reward points may operate in the same fashion as frequent flyer points, loyalty points, or other similar reward programs. For example, the user of the UE 400 operating any of the gambling games can accrue reward points based on the number of games played, the number of minutes played, the amount of money spent to purchase the game software application program(s), the amount of money gambled in one round of game play or one hand of cards, the total amount gambled in the session, or the like, alone or in combination. The reward points can be exchanged for cash rewards and/or gifts from the casino venue 440. For example, the casino venue 440 can provide dining discounts, free dining, hotel discounts, hotel upgrades, entertainment discounts, discounts for spa or other hotel services, discounts for golf or other outings, discounts for sporting events, and the like. The software applications can keep track of the reward points on the UE 400 or in association with the player account described above. If the gaming activity occurs via the secure website 508 (see FIG. 8), the secure website can also keep track of reward points. Associating reward points with the player account will reward users that play multiple different games. If the reward points are tracked on the UE 400, the information may be sent back to the gaming controller 506 or the secure website 508 on a periodic basis.

In yet another aspect, social activities can be promoted by gambling through the use of the UE 400. For example, the UE 400 can be configured to display a list of all mobile devices that are playing a particular gambling game within the restricted geo-fenced area 449 or a portion of the geo-fenced area. This would permit players of the same game to socialize with each other. In addition, a picture of each mobile device user can be included in the list as well. A mobile device user may select one or more other users that are playing the same gambling game, such as a slot machine, or the like, and the mobile user can exchange text messages with the one or more other players. As discussed above with respect to message types, the messages can be Public Messages, Group Messages, or Private Messages. In addition, other messages, such as audio, image data, pictures, videos, binary files, or the like can be exchanged between players. This capability effectively creates a social network of game players in the network based on the particular gambling game that is being played or simply a social network of game players in the vicinity of the UE 400 and within the geo-fenced area 449.

In another aspect, the text message data or other message data may be periodically uploaded to the database server 470 (See FIG. 6) in the JUMMMP Cloud 456. An analysis of the data can be used to understand visitor behavior. The analyzed data can assist in the improvement of quality of the gambling games and the data can also provide targeted real-time individual advertising. Advertising may be in a form of promotions, ads, offers, quick response (QR), codes, redeemable coupons, and the like. The advertising is provided to the UEs 400 via the APs 448, including the selected APs 448a-448i (see FIG. 10). Because the data is collected within the confines of the venue 440, the data may be controlled and owned by the owner of the venue 440 or the operator of the JUMMMP Cloud 456. The data can be collected and sold to interested parties, or analyzed and used to provide targeted real-time personal advertising to the UEs 400 within the network. Where applicable, user authorization for the collection and use of data may be obtained.

In another embodiment, the JUMMMP network website 200 (see FIG. 3) or other social network website 206 provides each user of a UE 400 an opportunity to log into, and see text messages exchanged with others also in the network. In addition, the secure website 508 (see FIG. 8) can provide data indicating the player points, reward points, and the history of the gambling games played.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter medial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system for gambling using a wireless communication device, comprising:
   a wireless network comprising a plurality of wireless access points controlled by a licensed gaming establishment and distributed within the licensed gaming establishment, each of the plurality of wireless access points having a transmitter, a receiver, and an antenna, the wireless network being configured to determine the location of the wireless communication device within the gaming establishment;
   an internal website controlled by the licensed gaming establishment and configured to perform gambling operations; and
   if the location of the wireless communication device within the gaming establishment is determined to be in a specified location within the gaming establishment, the wireless network being further configured to establish a gaming communication link between a web browser in the wireless communication device and the website operated by the gaming establishment to thereby permit gambling activity to be conducted via the website wherein the gaming communication link is contained within the licensed gaming establishment.

2. The system of claim 1 wherein the gaming communication link is established between the wireless communication device and the website using one or more of the plurality of wireless access points.

3. The system of claim 1 wherein the wireless network is configured to determine the location of the wireless communication device within the gaming establishment by identifying which of the plurality of wireless access points the wireless communication device is communicating with in the gaming establishment.

4. The system of claim 3 wherein the wireless network is configured to establish the gaming communication link only if the wireless communication device is communicating with selected ones of the plurality of wireless access points within the gaming establishment.

5. The system of claim 4 wherein the wireless network is further configured to terminate the gaming communication link if the wireless communication device is not in communication with at least one of the selected ones of the plurality of wireless access points within the gaming establishment.

6. The system of claim 4 wherein the each of the selected ones of the plurality of wireless access points within the gaming establishment has an area of coverage in which the gaming communication link can be established, the area of coverage of at least a portion of the selected ones of the plurality of wireless access points within the gaming establishment being configurable by adjusting a transmit power in the transmitters of the portion of the selected ones of the plurality of wireless access points within the gaming establishment.

7. The system of claim 4 wherein the each of the selected ones of the plurality of wireless access points within the gaming establishment has an area of coverage in which the gaming communication link can be established, the area of coverage of at least a portion of the selected ones of the plurality of wireless access points within the gaming establishment being configurable by adjusting an antenna pattern of the antenna for each of the portion of the selected ones of the plurality of wireless access points within the gaming establishment.

8. The system of claim 1 wherein the website is further configured to provide loyalty rewards to a player for the gambling activities under selected conditions.

9. The system of claim 8 wherein each player has established a player account maintained in association with the website wherein the website is configured to maintain the loyalty rewards in association with the player account.

10. A system for gambling using a wireless communication device, comprising:
a wireless network comprising a plurality of wireless access points controlled by a licensed gaming establishment and distributed within the licensed gaming establishment, each of the plurality of wireless access points having a transmitter, a receiver, and an antenna, wherein selected ones of the plurality of wireless access points within the gaming establishment have an area of coverage;
an internal website controlled by the licensed gaming establishment and configured to perform gambling operations; and
the wireless network being further configured to establish a communication link between the wireless communication device and any of the plurality of wireless access points within the gaming establishment to permit communications between the wireless communication device and the gaming establishment, but only establishing a gaming communication link between a web browser in the wireless communication device and the website operated by the gaming establishment to thereby permit gambling activity to be conducted via the website if the wireless communication device has established a communication link with any of the selected ones of the plurality of wireless access points within the gaming establishment.

11. The system of claim 10 wherein the area of coverage of at least a portion of the selected ones of the plurality of wireless access points within the gaming establishment is configurable by adjusting a transmit power in the transmitters of the portion of the selected ones of the plurality of wireless access points within the gaming establishment.

12. The system of claim 10 wherein the area of coverage of at least a portion of the selected ones of the plurality of wireless access points within the gaming establishment is configurable by adjusting an antenna pattern of the antenna for each of the portion of the selected ones of the plurality of wireless access points within the gaming establishment.

13. A method for gambling using a wireless communication device, comprising:
establishing a communication link between the wireless communication device and a wireless network controlled by a licensed gaming establishment and comprising a plurality of wireless access points distributed within the licensed gaming establishment, each of the plurality of wireless access points having a transmitter, a receiver, and an antenna;
determining a location of the wireless communication device within the gaming establishment; and
if the location of the wireless communication device within the gaming establishment is determined to be in a specified location within the gaming establishment, permitting the establishment of a gaming communication link between a web browser in the wireless communication device and an internal website operated by the gaming establishment to thereby permit gambling activity to be conducted via the website wherein the gaming communication link is contained within the licensed gaming establishment.

14. The method of claim 13 wherein selected ones of the plurality of wireless access points within the gaming establishment have an area of coverage and determining the location of the wireless communication device within the gaming establishment comprises determining whether the wireless communication device is communicating with any of the selected ones of the plurality of wireless access points within the gaming establishment and permitting the establishment of the gaming communication link if the wireless communication device is within the area of coverage of any of the selected ones of the plurality of wireless access points within the gaming establishment.

15. The method of claim 14, further comprising adjusting the area of coverage of at least a portion of the selected ones of the plurality of wireless access points within the gaming establishment by adjusting a transmit power in the transmitters of the portion of the selected ones of the plurality of wireless access points within the gaming establishment.

16. The method of claim 14, further comprising adjusting the area of coverage of at least a portion of the selected ones of the plurality of wireless access points within the gaming establishment by adjusting an antenna pattern of the antenna for each of the portion of the selected ones of the plurality of wireless access points within the gaming establishment.

\* \* \* \* \*